(12) United States Patent
Omori

(10) Patent No.: US 11,089,228 B2
(45) Date of Patent: Aug. 10, 2021

(54) INFORMATION PROCESSING APPARATUS, CONTROL METHOD OF INFORMATION PROCESSING APPARATUS, STORAGE MEDIUM, AND IMAGING SYSTEM

(71) Applicant: CANON KABUSHIKI KAISHA, Tokyo (JP)

(72) Inventor: Hirotaka Omori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/653,754

(22) Filed: Oct. 15, 2019

(65) Prior Publication Data

US 2020/0137281 A1 Apr. 30, 2020

(30) Foreign Application Priority Data

Oct. 25, 2018 (JP) .............................. JP2018-201267
Aug. 21, 2019 (JP) .............................. JP2019-151406

(51) Int. Cl.
*H04N 5/235* (2006.01)
*H04N 5/232* (2006.01)

(52) U.S. Cl.
CPC ......... *H04N 5/2351* (2013.01); *H04N 5/2353* (2013.01); *H04N 5/2355* (2013.01); *H04N 5/23219* (2013.01)

(58) Field of Classification Search
CPC ............. H04N 5/2351; H04N 5/23219; H04N 5/2353; H04N 5/2355; H04N 5/23245; G06K 9/6227; G06K 9/4661; G06K 9/00221; G06K 9/00771
See application file for complete search history.

(56) References Cited

U.S. PATENT DOCUMENTS

| 8,125,512 B2 | 2/2012 | Fahn et al. | |
| 2010/0053358 A1* | 3/2010 | Kodama | H04N 5/23219 348/222.1 |
| 2012/0121129 A1* | 5/2012 | Okamoto | H04N 5/23212 382/103 |
| 2012/0200729 A1* | 8/2012 | Hoda | H04N 5/23219 348/222.1 |

(Continued)

FOREIGN PATENT DOCUMENTS

| CN | 107241558 A | 10/2017 |
| EP | 3585048 A1 | 12/2019 |

(Continued)

*Primary Examiner* — Jason A Flohre
(74) *Attorney, Agent, or Firm* — Canon U.S.A., Inc. IP Division

(57) ABSTRACT

An image acquisition unit configured to acquire an image obtained by performing image capturing of a subject using an imaging unit, a detection method setting unit configured to set a detection method of a subject for the image, a subject detection unit configured to detect a subject based on the detection method determined by the detection method setting unit, and an exposure determination unit configured to determine exposure based on a detection result obtained from the subject detection unit are included, and the detection method setting unit can set the detection method different for each of different regions in the image, based on predetermined information used in performing image capturing for obtaining the image.

10 Claims, 15 Drawing Sheets

(56) References Cited

U.S. PATENT DOCUMENTS

| | | | | |
|---|---|---|---|---|
| 2013/0265482 | A1* | 10/2013 | Funamoto | H04N 5/23245 |
| | | | | 348/349 |
| 2013/0307993 | A1* | 11/2013 | Kawarada | H04N 5/23219 |
| | | | | 348/169 |
| 2014/0168479 | A1* | 6/2014 | Ishii | H04N 5/23212 |
| | | | | 348/241 |
| 2014/0176784 | A1* | 6/2014 | Hongu | H04N 5/23212 |
| | | | | 348/349 |
| 2016/0173759 | A1* | 6/2016 | Nakamura | H04N 5/23219 |
| | | | | 348/222.1 |
| 2017/0272661 | A1* | 9/2017 | Tsubusaki | H04N 5/23212 |
| 2020/0059605 | A1* | 2/2020 | Liu | H04N 5/232935 |

FOREIGN PATENT DOCUMENTS

| | | |
|---|---|---|
| JP | 2005-86682 A | 3/2005 |
| WO | 2018/150768 A1 | 8/2018 |

* cited by examiner

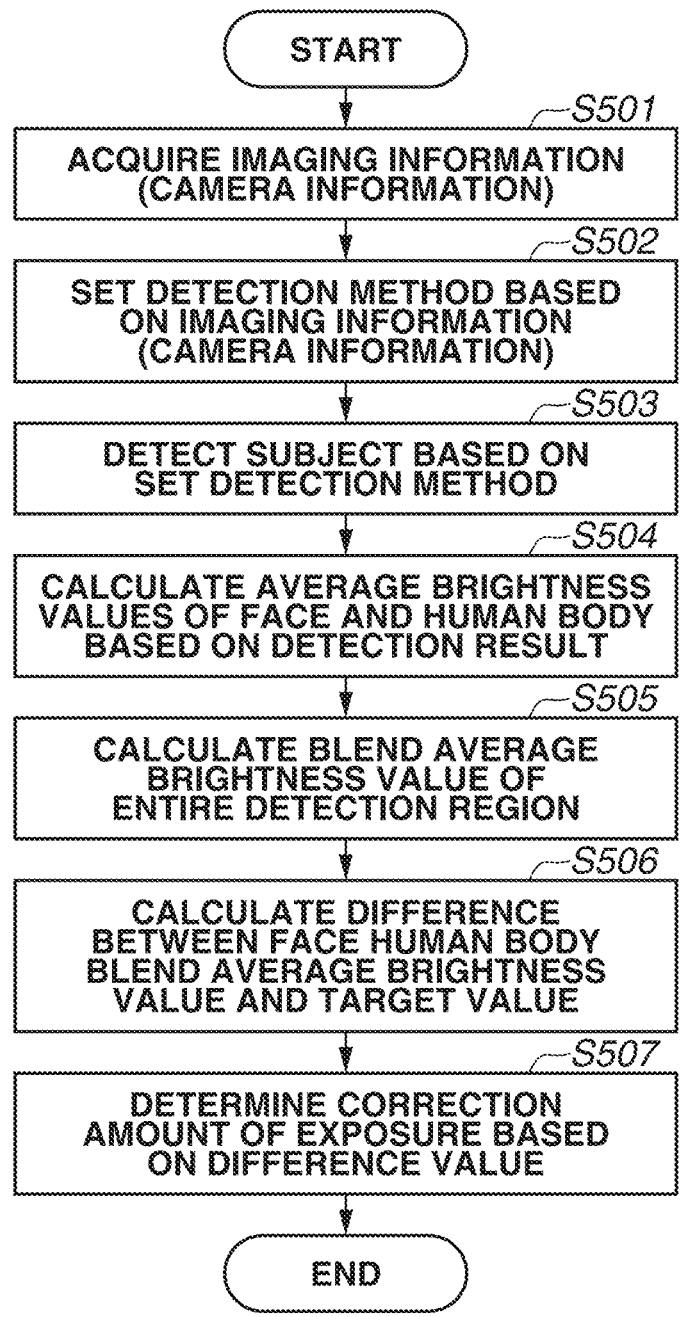

CUSTOM PHOTOMETRY

CENTER-WEIGHTED PHOTOMETRY

EVALUATION PHOTOMETRY

CUSTOM PHOTOMETRY

CENTER-WEIGHTED PHOTOMETRY

EVALUATION PHOTOMETRY

CAPTURED IMAGE

INFORMATION
REGARDING
SUBJECT DISTANCE

DETECTION REGION
CORRESPONDING TO
SUBJECT DISTANCE

SUBJECT DETECTION RESULT

SINGLE SCORE MAP

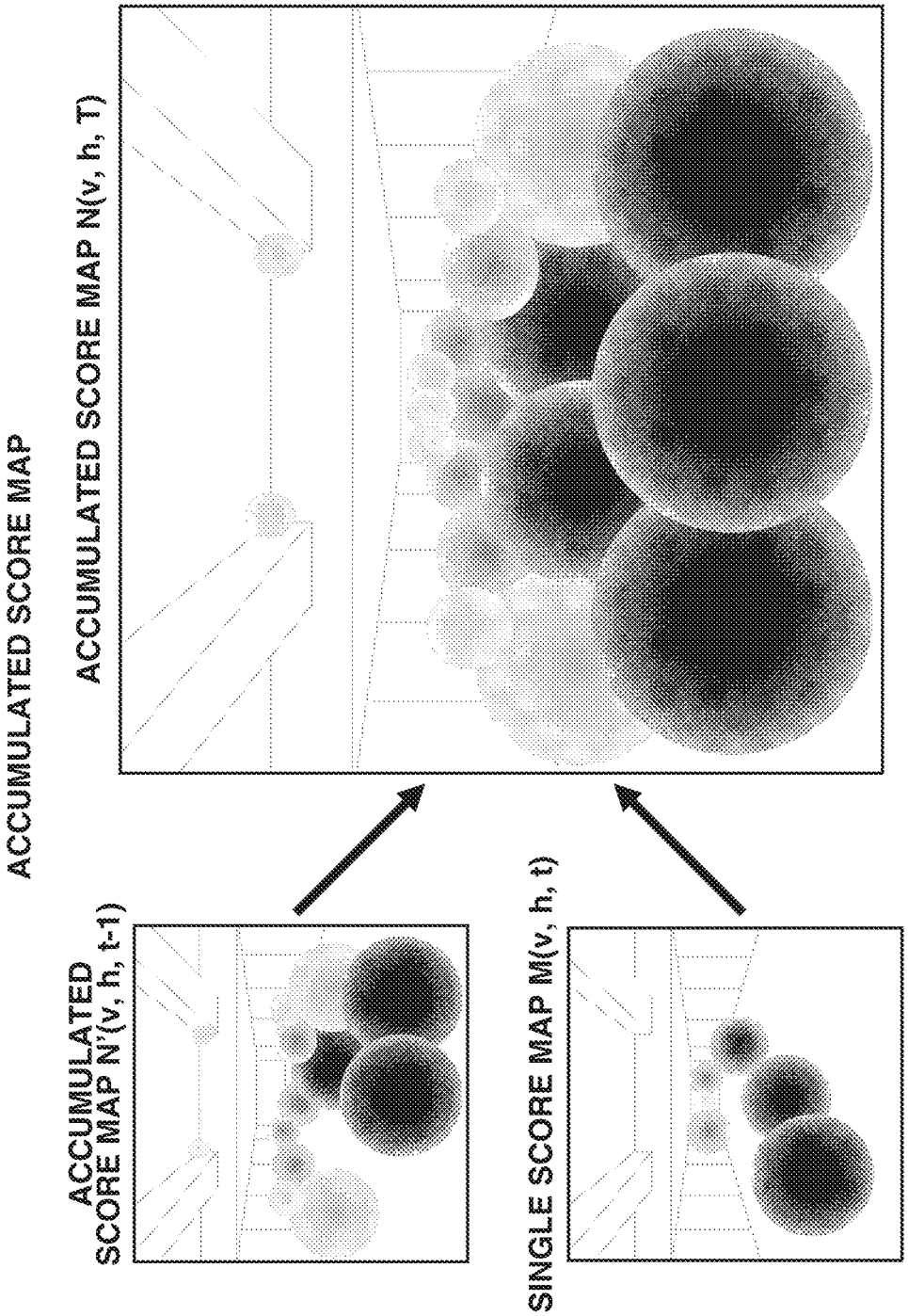

ically illustrating a function and a configuration executed by the client device according to the first exemplary embodiment of the present invention.

INFORMATION PROCESSING APPARATUS, CONTROL METHOD OF INFORMATION PROCESSING APPARATUS, STORAGE MEDIUM, AND IMAGING SYSTEM

BACKGROUND OF THE INVENTION

Field of the Invention

The present invention relates particularly to an information processing apparatus, a control method of an information processing apparatus, a storage medium, and an imaging system that can detect a subject in an image, and determine exposure based on the detected subject.

Description of the Related Art

In recent years, in imaging apparatuses such as monitoring cameras, digital cameras, or video cameras, a technique of automatically detecting a specific region regarding a predetermined subject, from among images obtained by performing image capturing of a subject has been discussed. Then, predetermined processing is applied based on information regarding the detected specific region.

Examples of the predetermined processing include exposure control processing of appropriately controlling exposure of a subject included in the detected specific region, focus adjustment processing of appropriately bringing a subject included in the detected specific region into focus, and the like. Japanese Patent Application Laid-Open No. 2005-86682 discusses a technique of determining a face to be subjected to focus adjustment or exposure control, based on positions of faces when a plurality of human faces is detected from a captured image.

SUMMARY OF THE INVENTION

According to an aspect of the present invention, an information processing apparatus includes at least one processor or circuit configured to perform operations of the following units, an image acquisition unit configured to acquire an image obtained by performing image capturing of a subject using an imaging unit, a detection method setting unit configured to set a detection method of a subject for the image, a subject detection unit configured to detect a subject based on the detection method determined by the detection method setting unit, and an exposure determination unit configured to determine exposure based on a detection result obtained from the subject detection unit, wherein the detection method setting unit can set the detection method different for each of different regions in the image, based on predetermined information used in performing image capturing for obtaining the image.

Further features of the present invention will become apparent from the following description of exemplary embodiments with reference to the attached drawings.

BRIEF DESCRIPTION OF THE DRAWINGS

FIG. 5 is a flowchart exemplarily illustrating detection processing and exposure determination processing according to the first exemplary embodiment of the present invention.

FIGS. 13A-13C are diagrams exemplarily illustrating a calculation method of a score map according to the third exemplary embodiment of the present invention.

DESCRIPTION OF THE EMBODIMENTS

Figure 1:
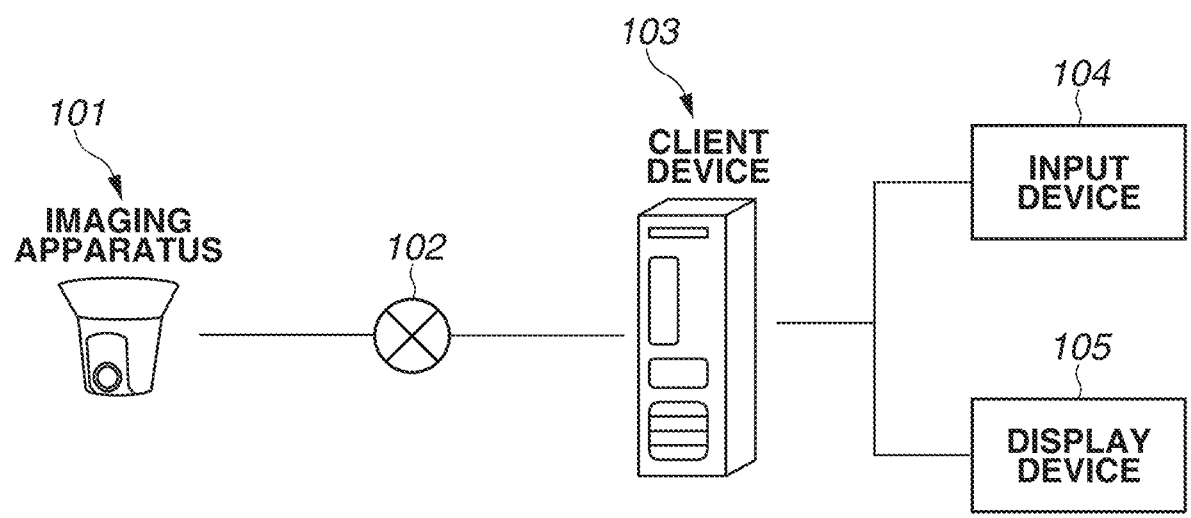
FIG. 1 is a block diagram exemplarily illustrating a configuration of an imaging control system according to a first exemplary embodiment of the present invention.

Hereinafter, an information processing apparatus according to an exemplary embodiment of the present invention will be described with reference to FIGS. 1 to 11. In addition, one or more functional blocks of the undermentioned functional blocks illustrated in the drawings may be implemented by hardware such as application specific integrated circuits (ASIC) or a programmable logic array (PLA), or may be implemented by a programmable processor such as a central processing unit (CPU) or a micro processing unit (MPU) executing software. Alternatively, the one or more functional blocks may be implemented by a combination of software and hardware. Thus, in the following description, even when different functional blocks are described as operation actors, the same hardware can be implemented as an actor.

(Basic Configuration)

FIG. 1 is a block diagram exemplarily illustrating a configuration of an imaging control system (imaging system) according to a first exemplary embodiment of the present invention. The imaging control system illustrated in FIG. 1 includes a monitoring camera (imaging apparatus) 101, a network 102, a client device 103, an input device 104, and a display device 105. In addition, the monitoring camera 101 is an apparatus that can perform image capturing of a subject and image processing for acquiring a moving image. Then, the monitoring camera 101 and the client device 103 are connected via the network 102 in a state in which communication can be performed with each other.

Figure 2:
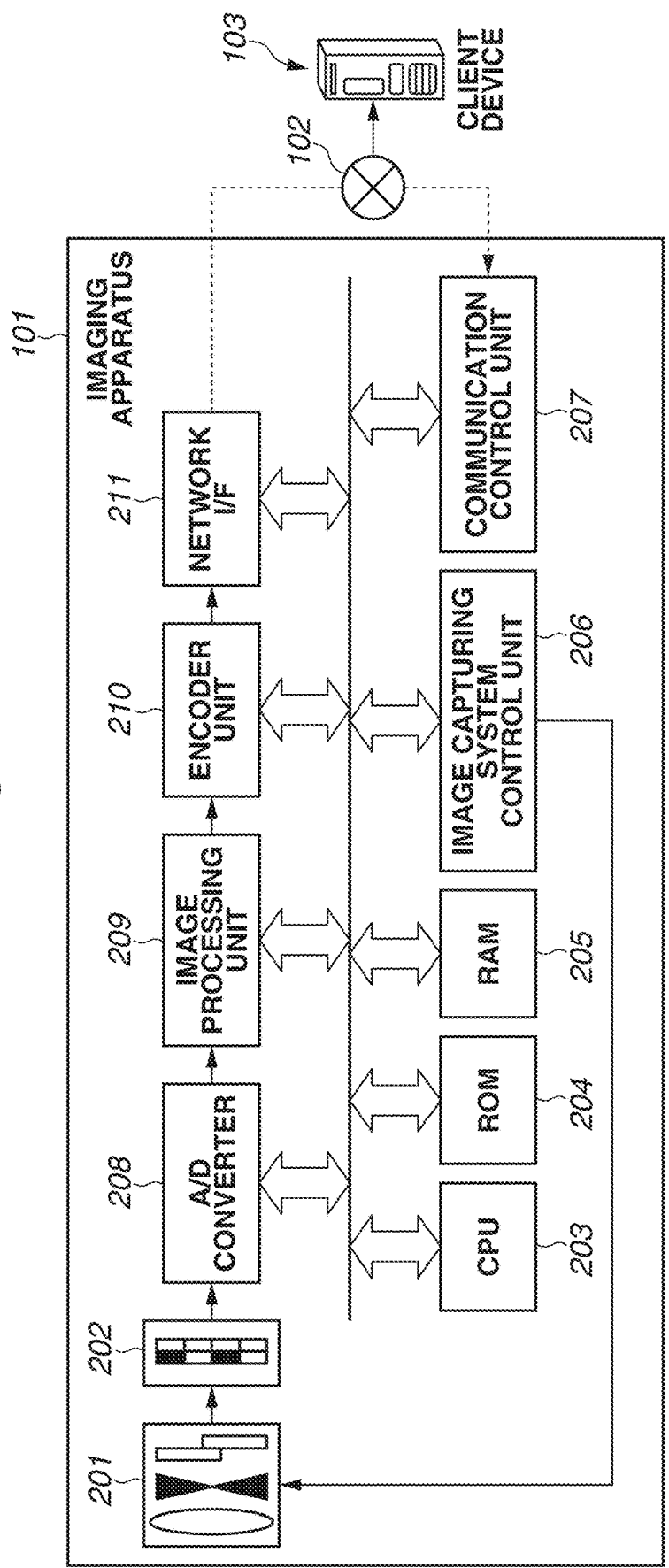
FIG. 2 is a block diagram exemplarily illustrating an internal configuration of a monitoring camera according to the first exemplary embodiment of the present invention.

FIG. 2 is a block diagram exemplarily illustrating an internal configuration of the monitoring camera 101 according to the first exemplary embodiment of the present invention. An imaging optical system 201 includes a zoom lens, a focus lens, an image stabilization lens, a diaphragm, a shutter, and the like, and is an optical member group that collects optical information about a subject.

An image sensor 202 is a charge accumulation-type solid-state image sensor such as a complementary metal-oxide semiconductor (CMOS) sensor or a charge-coupled device (CCD) sensor that converts light fluxes collected to the imaging optical system 201, into an electric current value (signal value), and is an imaging unit that acquires color information by being combined with a color filter or the like. In addition, the image sensor 202 is an image sensor in which an arbitrary exposure time is settable for a pixel.

A camera CPU 203 is a control unit that comprehensively controls the operations of the monitoring camera 101. The camera CPU 203 reads a command stored in a read only memory (ROM) 204 or a random access memory (RAM) 205, and executes processing in accordance with the read result. In addition, an image capturing system control unit 206 performs control of each component of the monitoring camera 101 such as focus control, shutter control, or diaphragm adjustment of the imaging optical system 201 (that is based on an instruction from the camera CPU 203). A communication control unit 207 performs control for transmitting control related to each component of the monitoring camera 101, to the camera CPU 203, by the communication performed with the client device 103.

An analog-to-digital (A/D) converter 208 converts a light amount of a subject detected by the image sensor 202, into a digital signal value. An image processing unit 209 is an image processing unit that performs image processing on image data of a digital signal output from the image sensor 202. An encoder unit 210 is a conversion unit that performs processing of converting the image data processed by the image processing unit 209, into a file format such as Motion Jpeg, H264, or H265. A network I/F 211 is an interface used for performing communication via the network 102 with an external device such as the client device 103, and is controlled by the communication control unit 207.

The network 102 is an Internet Protocol (IP) network that connects the monitoring camera 101 and the client device 103. The network includes a plurality of routers, switches, cables, and the like that satisfies a communication standard such as the Ethernet (registered trademark), for example. In the present exemplary embodiment, the network 102 is only required to enable communication to be performed between the monitoring camera 101 and the client device 103, and a communication standard, a scale, a configuration, and the like of the network 102 are not limited. For example, the network 102 may include the Internet, a wired local area network (LAN), a wireless LAN, a wide area network (WAN), or the like.

Figure 3:
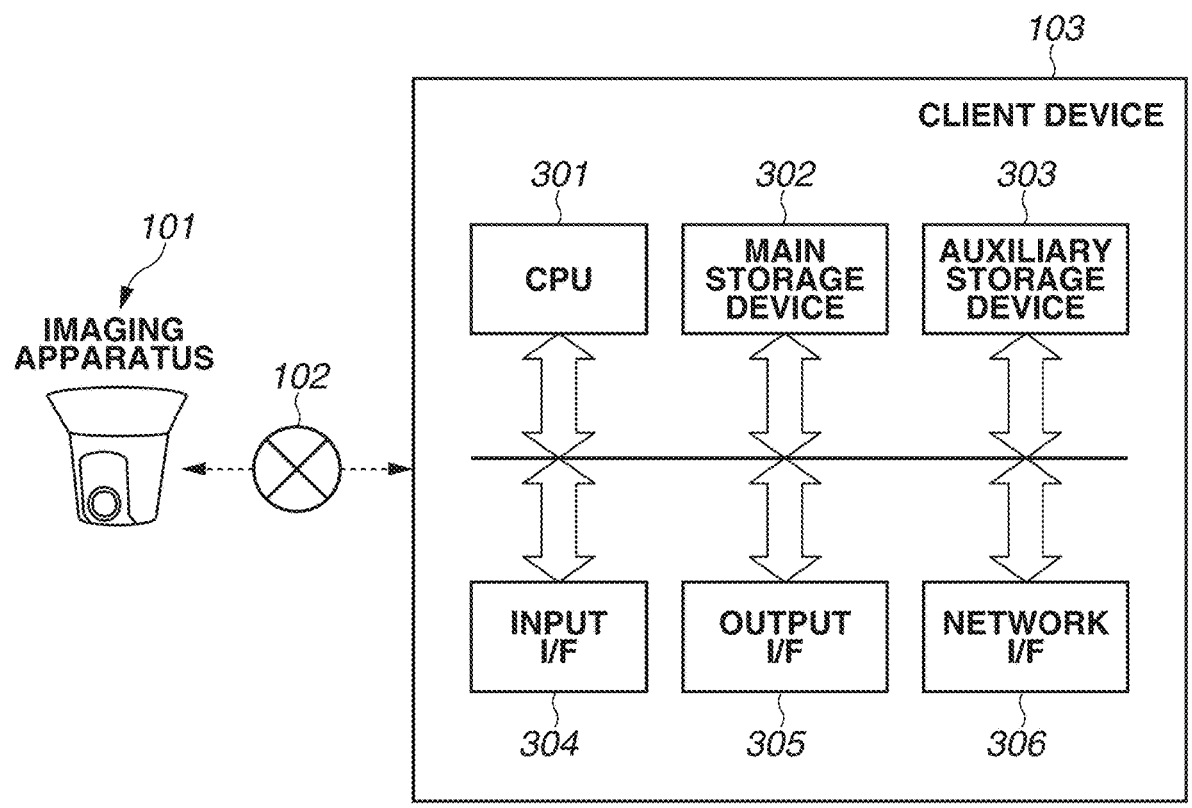
FIG. 3 is a block diagram exemplarily illustrating an internal configuration of a client device serving as an information processing apparatus according to the first exemplary embodiment of the present invention.

FIG. 3 is a block diagram exemplarily illustrating an internal configuration of the client device 103 serving as an information processing apparatus according to the first exemplary embodiment of the present invention. The client device 103 includes a client CPU 301, a main storage device 302, an auxiliary storage device 303, an input I/F 304, an output I/F 305, and a network I/F 306. The components are connected via a system bus so that communication can be performed with each other.

The client CPU 301 is a central processing unit that comprehensively controls the operations of the client device 103. In addition, the client CPU 301 may be configured to comprehensively control the monitoring camera 101 via the network 102. The main storage device 302 is a storage device such as a RAM that functions as a temporary storage location of data of the client CPU 301. The auxiliary storage device 303 is a storage device such as a hard disk drive (HDD), a ROM, or a solid-state drive (SSD) that stores various programs, various kinds of setting data, and the like. The input I/F 304 is an interface used for receiving an input from the input device 104 or the like. The output I/F 305 is an interface used for outputting information to the display device 105 or the like. The network I/F 306 is an interface used for performing communication via the network 102 with an external device such as the monitoring camera 101.

Figure 4:
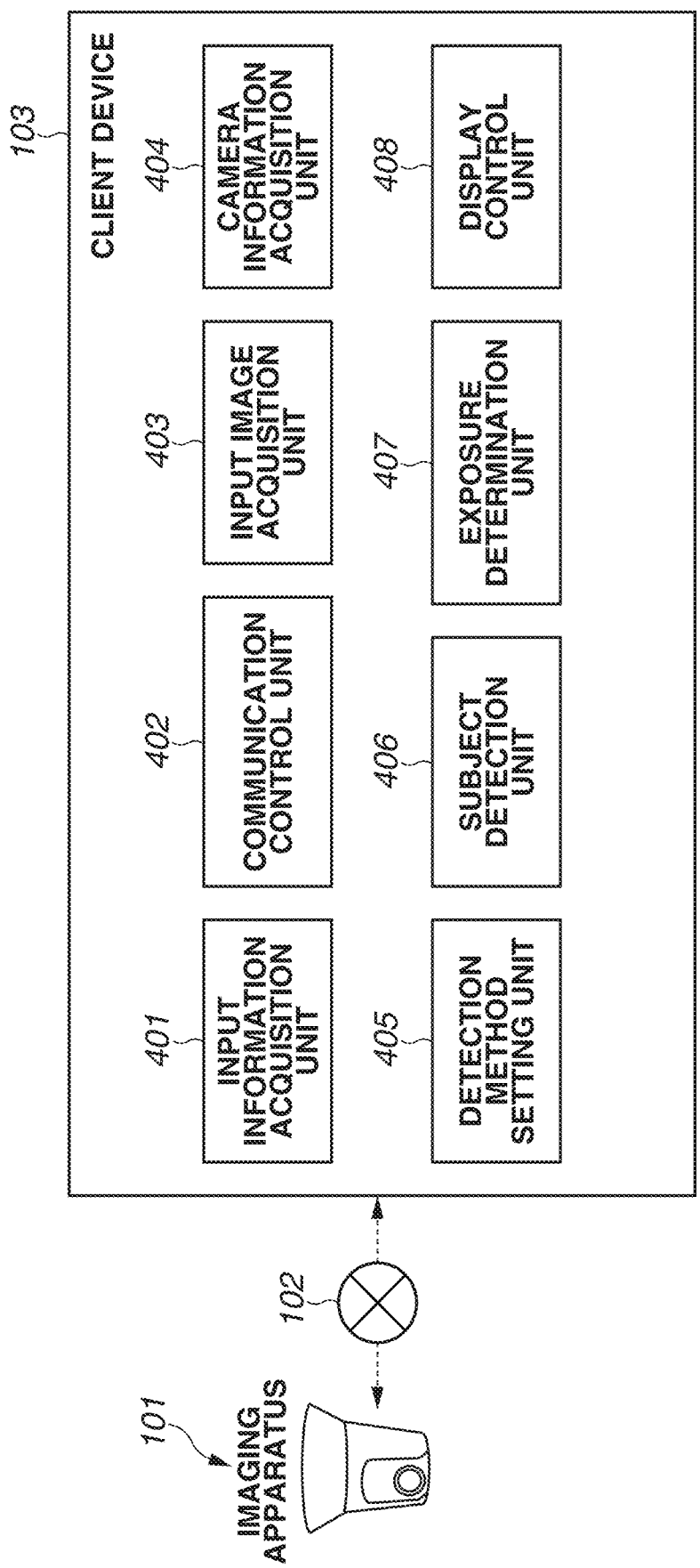
FIG. 4 is a diagram exemplarily illustrating a function and a configuration executed by the client device according to the first exemplary embodiment of the present invention.

By the client CPU 301 executing processing based on a program stored in the auxiliary storage device 303, a function and processing of the client device 103 that are illustrated in FIG. 4 are implemented. The details will be described below.

As illustrated in FIG. 1, the input device 104 is an input device including a mouse, a keyboard, and the like. The display device 105 is a display device such as a monitor that displays an image output by the client device 103. In the present exemplary embodiment, the client device 103, the input device 104, and the display device 105 are independent configurations separated from each other, but the configurations of these are not limited to these. For example, the client device 103 and the display device 105 may be integrated, or the input device 104 and the display device 105 may be integrated. Alternatively, the client device 103, the input device 104, and the display device 105 may be integrated.

FIG. 4 is a diagram exemplarily illustrating a function and a configuration executed by the client device 103 according to the first exemplary embodiment of the present invention. In other words, the components illustrated in FIG. 4 are functions and configurations that can be executed by the client CPU 301, and each of these components is synonymous with the client CPU 301. More specifically, the client CPU 301 of the client device 103 includes an input information acquisition unit 401, a communication control unit 402, an input image acquisition unit 403, a camera information acquisition unit 404, a detection method setting unit 405, a subject detection unit 406, an exposure determination unit 407, and a display control unit 408. In addition, the client device 103 may include the components illustrated in FIG. 4, as another configuration different from the client CPU 301.

The input information acquisition unit 401 is an input unit that receives an input performed by the user via the input device 104.

The communication control unit 402 executes control for receiving, via the network 102, an image transmitted from the monitoring camera 101. In addition, the communication control unit 402 executes control for transmitting a control command to the monitoring camera 101 via the network 102.

The input image acquisition unit 403 is an image acquisition unit that acquires, via the communication control unit 402, an image captured by the monitoring camera 101, as an image to be subjected to detection processing of a subject. The details of the detection processing will be described below. The camera information acquisition unit 404 is an acquisition unit that acquires, via the communication control unit 402, camera information (imaging information) used by the monitoring camera 101 in performing image capturing of a subject. The camera information (imaging information) is various types of information used in acquiring an image by performing image capturing of a subject, and the details of the information will be described below.

The detection method setting unit 405 is a detection method setting unit that sets, for the image acquired by the input image acquisition unit 403, a predetermined detection method from among various detection methods (ways) including the detection of a face region (face detection) and the detection of a human body region (human body detection). In the case of performing the face detection, the undermentioned subject detection unit 406 preferentially detects a face region in the image, and in the case of performing the human body detection, the subject detection unit 406 preferentially detects a human body region in the image. In addition, in the present exemplary embodiment, detection target regions can be set in a plurality of regions in an image (screen)

The detection method setting unit 405 in the present exemplary embodiment is configured to set an arbitrary method out of the face detection and the human body detection, but the detection method is not limited to these. For example, a configuration of detecting a feature region of a part of a person such as an upper body of a person or a partial region of a face such as an eye, a nose, or a mouth may be selectable. In addition, in the present exemplary embodiment, a person will be described as a detection target subject, but a specific region related to a predetermined subject other than a person may be detectable. For example, a predetermined subject preset in the client device 103, such as a face of an animal or an automobile may be detectable.

The subject detection unit 406 is a subject detection unit that detects a predetermined subject region based on the detection method set by the detection method setting unit 405.

The exposure determination unit 407 is an exposure determination unit that determines, based on a detection result obtained from the subject detection unit 406, exposure to be set in acquiring an image by performing image capturing of a subject. In addition, the exposure to be determined by the exposure determination unit 407 includes an exposure value following program lines for exposure control that are prerecorded in the client device 103, and moreover, an exposure correction value for correcting the exposure value. Information regarding the exposure determined by the exposure determination unit 407 is transmitted by the communication control unit 402 to the monitoring camera 101, and exposure control is executed in the monitoring camera 101. The detailed processing related to the operations of the detection method setting unit 405, the subject detection unit 406, and the exposure determination unit 407 will be described below with reference to a flowchart illustrated in FIG. 5. The display control unit 408 is a display control unit that outputs, to the display device 105, an image in which the exposure determined by the exposure determination unit 407 is reflected, in accordance with an instruction from the client CPU 301.

(Detection Processing of Subject and Exposure Determination Processing)

Hereinafter, detection processing of a subject and exposure determination processing according to the present exemplary embodiment will be described with reference to the flowchart illustrated in FIG. 5. FIG. 5 is a flowchart exemplarily illustrating detection processing and exposure determination processing according to the first exemplary embodiment of the present invention. In addition, the processing is premised on a state in which a power source of each device is turned on and the connection (communication) between the monitoring camera 101 and the client device 103 is established in the imaging system illustrated in FIG. 1. Then, in this state, the image capturing of a subject, the transmission of image data, and image display on the display device are repeated at a predetermined update cycle in the imaging system. Then, the flowchart illustrated in FIG. 5 is started upon the client CPU 301 of the client device 103 receiving the input of an image obtained by performing image capturing of a subject, from the monitoring camera 101 via the network 102.

First of all, in step S501, camera information (imaging information) used by the monitoring camera 101 in acquiring an image by performing image capturing of a subject is acquired from the camera information acquisition unit 404. For example, as the camera information, information regarding a photometry mode in the monitoring camera 101 or the like is acquired. In the present exemplary embodiment, a configuration in which three modes including a custom photometry mode, a center-weighted photometry mode, and an evaluation photometry mode are settable as photometry modes in the monitoring camera 101 will be described, but the photometry modes are not limited to these, and other photometry modes such as a spot photometry mode or a partial photometry mode may be settable. In addition, a photometry mode arbitrarily set by the user on the client device 103 side may be recorded as a photometry mode, and the processing in step S501 may be executed based on the recorded information.

Figure 6A:
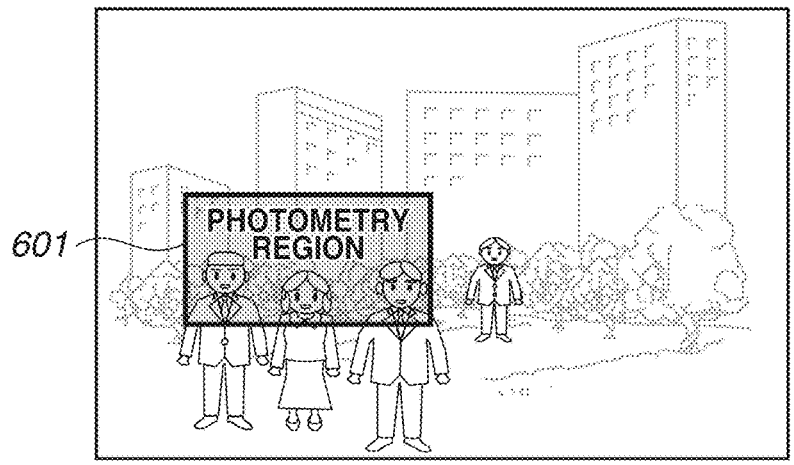
FIGS. 6A-6C are diagrams each exemplarily illustrating a relationship between a photometry mode and a photometry region according to an exemplary embodiment of the present invention.
Figure 6B:
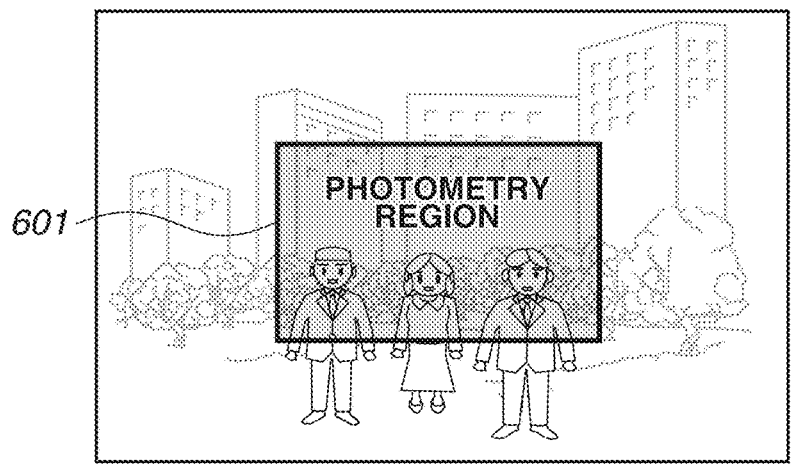
Figure 6C:
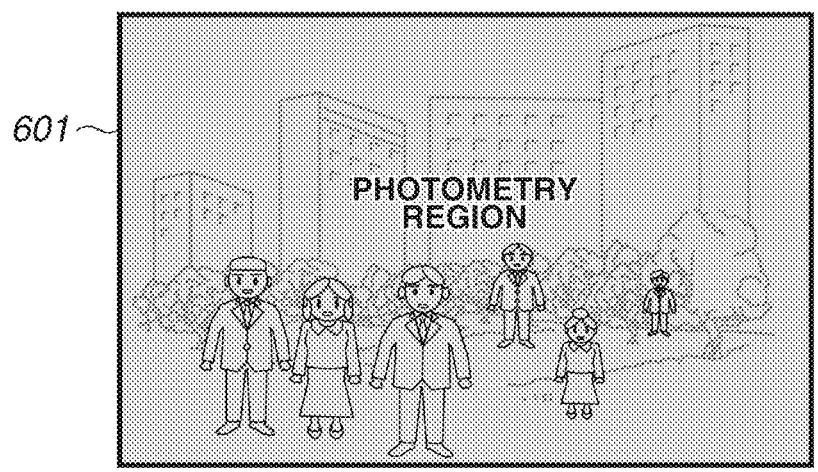

FIGS. 6A-6C are diagrams each exemplarily illustrating a relationship between a photometry mode and a photometry region according to an exemplary embodiment of the present invention. The custom photometry mode in the present exemplary embodiment is a photometry mode in which the user can designate a photometry region 601 at an arbitrary position in an image (screen) as illustrated in FIG. 6A. In this case, it is considered that, in the custom photometry mode, an imaging (monitoring) target intended by the user is highly likely to be included in a photometry region (specific region) designated by the user. In addition, the center-weighted photometry mode is a photometry mode in which the photometry region 601 is set near the center of the image as illustrated in FIG. 6B. In this case, it is considered that, an imaging (monitoring) target intended by the user is highly likely to exist at an approximately-center part of the image. Furthermore, the evaluation photometry mode is a photometry mode in which the photometry region 601 is set over the entire image as illustrated in FIG. 6C. In this evaluation photometry mode, it is considered that the user does not narrow down a region of an imaging target subject intended by the user, to an arbitrary region, and an imaging (monitoring) target intended by the user exists in any region in the entire image.

The photometry region 601 in each of the aforementioned photometry modes is a region in which a larger weighting is set in determining exposure than those for other regions. In addition, a way of weighting can include a configuration of setting only a subject existing within the photometry region 601, as a photometry target (i.e., setting a weighting for the outside of the photometry region 601 to 0).

Figure 7A:
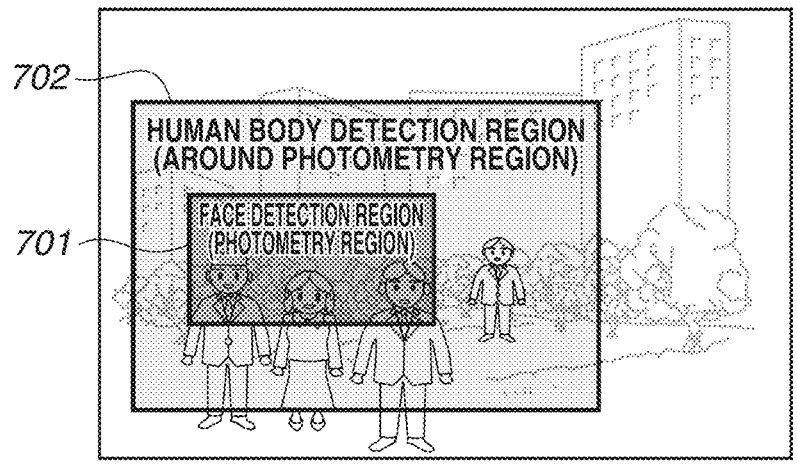
FIGS. 7A-7C are diagrams each exemplarily illustrating a relationship between a photometry region and a detection region of a subject according to the first exemplary embodiment of the present invention.
Figure 7B:
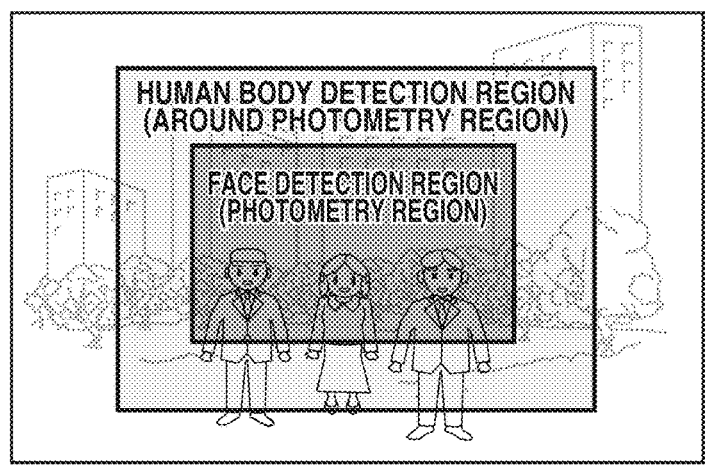
Figure 7C:
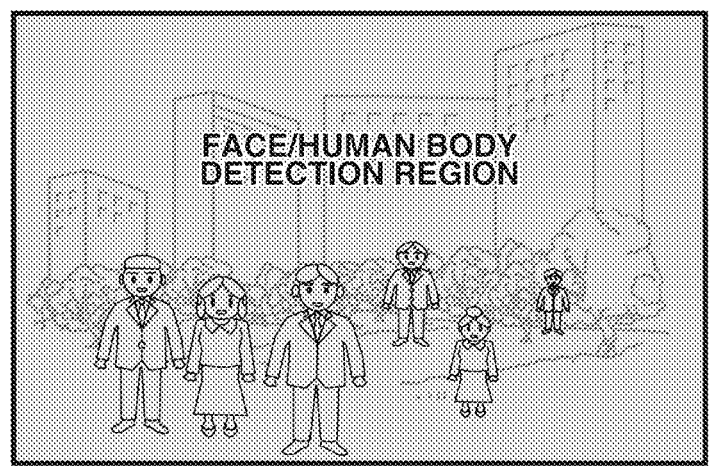

Next, in step S502, the detection method setting unit 405 sets a detection method (way) of a subject for each region in accordance with a photometry mode. FIGS. 7A-7C are diagrams each exemplarily illustrating a relationship between a photometry region and a detection region of a subject according to the first exemplary embodiment of the present invention. For example, when the custom photometry mode is selected, as illustrated in FIG. 7A, a face detection region 701 in which a face region is preferentially detected is set in accordance with the photometry region 601 selected by the user, and a human body detection region 702 in which a human body region is preferentially detected is set in accordance with the peripheral portion of the photometry region. This is because, in the case of performing image capturing (monitoring) using a person as a subject, it can be expected that a face region is highly likely to exist in a region in the image that is set as the photometry region 601, as a main imaging (monitoring) target subject intended by the user. In addition, this is because, in the case of performing image capturing (monitoring) using a person as a subject, it can be expected that a human body region corresponding to the main subject or a human body region of another person is highly likely to exist near the region in the image that is set as the photometry region 601 (peripheral region).

In addition, a detection method to be applied to an image varies between the face detection region and the human body detection region. For example, in the face detection region and the human body detection region, the respective patterns corresponding to a feature portion of a face and a feature portion of a human body are prestored on the client device 103 side, and a face region and a human body region are detected by pattern matching that is based on the patterns. In the case of detecting a face region, it is possible to detect a face with a high degree of accuracy and clearly distinguish between the face region and a subject other than the face. Nevertheless, if the orientation of the face, the size of the face, the brightness of the face, or the like does not fall under a condition suitable for the face detection, a face region cannot be accurately detected. In contrast to this, in the case of performing the human body detection, it is possible to detect a region in which a person exists, irrespective of the orientation of the face, the size of the face, the brightness of the face, or the like.

In the imaging system according to the present exemplary embodiment, detection regions in which respective detection methods optimum for a region with a high probability of the existence of a face and a region with a high probability of the existence of a human body are set can be applied, and subject detection processing can be omitted in the other regions. With this configuration, in the imaging system according to the present exemplary embodiment, by setting an optimum detection method for each region, it is possible to reduce processing load related to detection, while enhancing detection accuracy of a subject.

Similarly to the custom photometry mode, also in the center-weighted photometry mode, as illustrated in FIG. 7B, a face detection region is set in the center region of the screen, a human body detection region is set around the face detection region, and the remaining region is set so that the detection is not performed. In addition, in the case of the evaluation photometry mode, as illustrated in FIG. 7C, either the face detection region or the human body detection region, or a detection region corresponding to a detection method adapted to both of a face and a human body is set over the entire screen in accordance with the photometry region 601.

Referring back to FIG. 5, in step S503, the subject detection unit 406 detects a subject based on a detection method set by the detection method setting unit 405 for each region of the image. In addition, as a detection method of a subject, a pattern (classifier) created using statistical learning as the above-described pattern matching method may be used, or subject detection that uses brightness gradient in a localized region may be performed as a method other than the pattern matching. In other words, these methods are not limited as a detection method, and any of various methods such as the detection that is based on machine learning or the detection that is based on distance information can be employed.

Next, in step S504, the exposure determination unit 407 calculates an average brightness value $I_{face}$ of the face region and an average brightness value $I_{body}$ of the human body region based on the detection result obtained from the subject detection unit 406. Specifically, based on the detection result obtained from the subject detection unit 406, the exposure determination unit 407 applies information regarding the number of detected faces and detected human bodies, positions at which the faces and the human bodies are detected, and the sizes of the faces and the human bodies, to the following Expressions (1) and (2). In addition, in the present exemplary embodiment, the exposure determination unit 407 performs the calculation using a brightness value (BV) in an additive system of photographic exposure (APEX) as a unit of a brightness value.

$$\bar{I}_{face} = \frac{1}{f}\sum_{s=1}^{f}\left\{\frac{1}{k_s \times l_s}\sum_{i=-k_s/2}^{k_s/2}\sum_{j=-j_s/2}^{l_s/2} I(v_s+i, h_s+j)\right\} \quad (1)$$

$$\bar{I}_{body} = \frac{1}{g}\sum_{s=1}^{g}\left\{\frac{1}{k_s \times l_s}\sum_{i=-k_s/2}^{k_s/2}\sum_{j=-j_s/2}^{l_s/2} I(v_s+i, h_s+j)\right\} \quad (2)$$

In these Expressions, I(x, y) denotes a brightness value at a two-dimensional coordinate position (x, y) in a horizontal direction (x-axis direction) and a vertical direction (y-axis direction) in the image. In addition, f and g denote the number of detected faces and the number of human bodies, (v, h) denotes a central coordinate at which a face or a human body is detected, and k and l respectively denote detection sizes of a subject in the horizontal direction and the vertical direction. In addition, if human body portions corresponding to faces that have already been detected in the face detection region 701 are excluded from the calculations in Expressions (1) and (2), from among human body portions detected in the human body detection region 702, subject detection with a higher degree of accuracy can be performed.

In step S505, based on the average brightness value $I_{face}$ of the face region and the average brightness value $I_{body}$ of the human body region that have been calculated in step S504, a face human body blend average brightness value $I_{blend}$ is calculated. For example, the face human body blend average brightness value $I_{blend}$ is calculated using Expressions (3) and (4).

$$\bar{I}_{blend} = \alpha \times \bar{I}_{face} + (1.0-\alpha) \times \bar{I}_{body} \quad (3)$$

$$0.0 \leq \alpha \leq 1.0 \quad (4)$$

In these Expressions, a parameter α is a parameter for controlling the influence exerted on the face human body blend average brightness value $I_{blend}$ by the average brightness value $I_{face}$ of the face region and the average brightness value $I_{body}$ of the human body region, and can be changed in accordance with the intention of the user. For example, when the user performs image capturing of a subject with a view to counting the number of persons in the entire screen, it is desirable that exposures of subjects existing over the entire screen are appropriately set. Thus, in such a case, for example, by setting α=0.5, an average brightness value of subjects existing over the entire screen can be used as a photometry value to be compared and evaluated in the processing in step S506 and the subsequent step. In addition, when the user performs image capturing of a subject with a view to identifying a face region or a person region in a specific region, it is desirable that exposure of a specific face region is appropriately set. Thus, by setting α=0.9, an average brightness value of faces in the specific region can be used as a photometry value to be compared and evaluated in the processing in step S506 and the subsequent step.

Next, in step S506, the exposure determination unit 407 calculates a difference value ΔDiff between a target brightness value $I_{target}$ of a predefined face and human body region, and the face human body blend average brightness value $I_{blend}$ calculated in step S505, as in Expression (5).

$$\Delta \text{Diff} = I_{target} - \bar{I}_{blend} \quad (5)$$

In this Expression, the target brightness value $I_{target}$ of the face and human body region may be a target value preset by the user, or may be a fixed value preset on hardware.

Lastly, in step S507, based on the difference value ΔDiff calculated in step S506, a predefined threshold value Th, and an exposure value EVcurrent related to the current exposure, a correction amount EVcorrection of exposure is determined. For example, as in Expression (6), the correction amount EVcorrection is determined. EVcurrent denotes an exposure value (EV) in the APEX conversion that is based on a subject brightness value (BV) obtained based on the above-described photometry region 601, and is set based on program lines related to exposure control that are prestored in the client device 103.

$$EV_{correction} = \begin{cases} EV_{current} - \beta & \text{if } \Delta Diff < -Th \\ EV_{current} & \text{if } -Th \leq \Delta Diff \leq Th \\ EV_{current} + \beta & \text{if } Th < \Delta Diff \end{cases} \quad (6)$$

In this Expression, parameter β is a coefficient that exerts influence on a correction degree (speed) used in correcting the exposure from the current exposure value EVcurrent toward the underexposure side or the overexposure side. By setting a large value of the parameter β, a processing speed (or time) required for reaching a target value becomes high (or short), but the brightness of the entire screen rapidly varies when erroneous determination is generated in a detection result or the detection of a subject gets unstable. On the other hand, by setting a small value of the parameter β, a processing speed (or time) required by exposure for reaching the target value becomes slow (or long), but robustness against erroneous detection and imaging conditions is obtained. The parameter β is set as a correction value of exposure for the current exposure value EVcurrent when the difference value ΔDiff calculated in step S506 is equal to or larger than the set threshold value Th.

As described above, in the imaging system according to the present exemplary embodiment, a region to which the user pays attention in image capturing (interest region) is estimated based on a photometry mode, and an optimum detection region (detection method) of a subject is set for each region in the image. Accordingly, in the imaging system according to the present exemplary embodiment, it is possible to determine a correction amount of exposure so as to obtain brightness at which a face of a subject is easily visible, in accordance with the intention of the user, and enhance the detection accuracy of a subject. In addition, in a region around the interest region to which the user pays attention, because the detection of a subject is enabled irrespective of the orientation of a face of a subject, the size of a part constituting the face, the brightness of the face, or the like, it is possible to accurately detect a person who is difficult to be detected in the face detection region, and a person becomes less likely to be missed in the detection. Furthermore, in the regions other than the interest region to which the user pays attention, by avoiding performing detection processing of a subject, it is possible to suppress the occurrence of erroneous detection and reduce processing load related to subject detection.

In the present exemplary embodiment, the description has been given of a configuration in which the detection method setting unit 405 sets a detection region (method) of a subject for each predetermined region in an image based on a photometry mode in image capturing, as predetermined information (imaging information) used in performing image capturing of a subject using the monitoring camera 101. Nevertheless, an exemplary embodiment of the present invention is not limited to this. For example, a mode related to auto focus (AF) processing related to focus adjustment, a mode related to white balance, or a modified example of setting a detection method (region) of a subject based on imaging information such as distance information about a subject may be employed. A configuration of setting a detection method (region) for each predetermined region in an image based on information regarding a region arbitrarily set by the user via the input device 104, as imaging information may be employed.

Figure 8A:
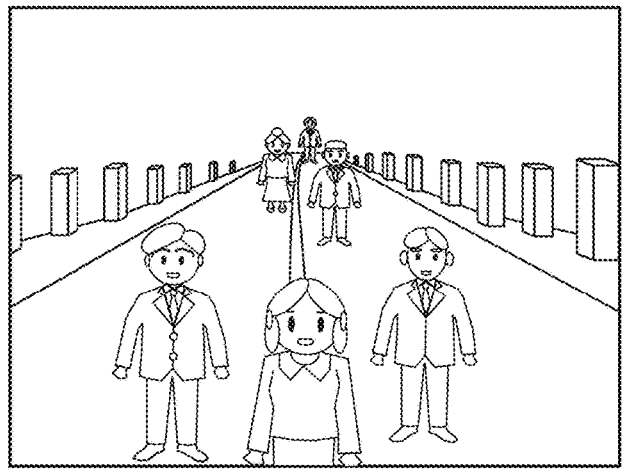
FIGS. 8A-8C are diagrams exemplarily illustrating a method of setting a detection region of a subject according to a modified example of the first exemplary embodiment of the present invention.
Figure 8B:
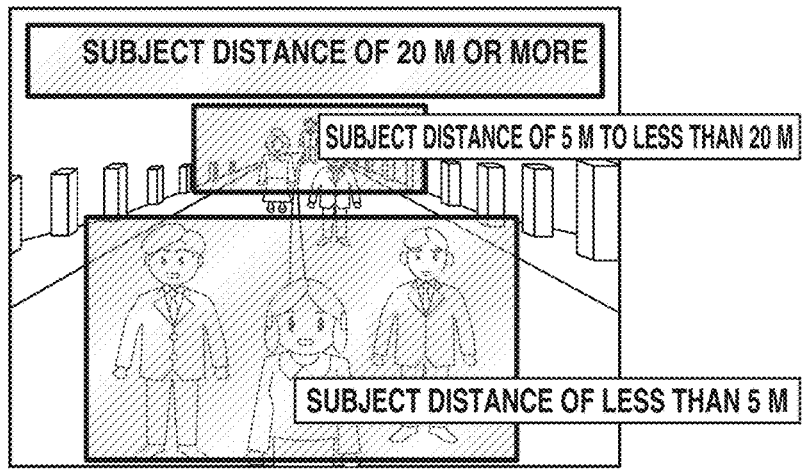
Figure 8C:
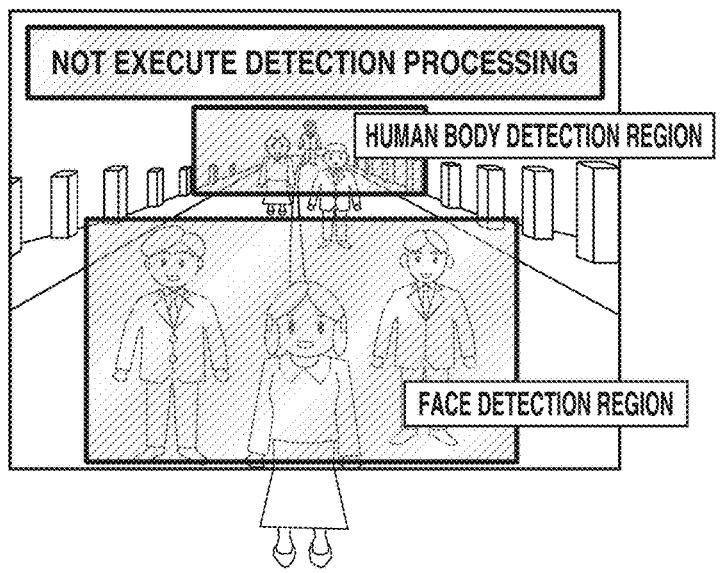

As the aforementioned modified example, a case of setting a detection method (region) based on distance information about a subject will be specifically described with reference to FIGS. 8A-8C. FIGS. 8A-8C are diagrams exemplarily illustrating a method of setting a detection region of a subject according to a modified example of the first exemplary embodiment of the present invention. In an imaging scene in which subjects exists at various distance positions as illustrated in FIG. 8A, distance information about each subject is assumed to be obtained as illustrated in FIG. 8B. Distance information about a subject can be acquired based on a focus evaluation value that is based on contrast information or phase difference information about an image obtained by the monitoring camera 101, or arbitrary regions in the image can be grouped based on subject distances in accordance with a manual input performed by the user In this case, as illustrated in FIG. 8C, a detection region (method) of a subject is set in accordance with a size of the subject such as a face or a human body that is estimated in accordance with a subject distance. For example, within a relatively-close range (first range) with a subject distance of less than 5 m from the monitoring camera 101, because the obtained size of the face is considered to be sufficiently large for executing face detection processing, the region is set as a face detection region. Within a range (second range) with a subject distance of 5 m to less than 20 m from the monitoring camera 101, the size of the subject in this region is insufficient (small) for detecting a face but a human body is considered to be detectable without any problem, and the region is set as a human body detection region. Then, in the remaining region, it is considered that a face and a human body cannot be accurately detected, and a detection region of a subject is not set in the region, and control is performed such that the detection of a subject is not performed in the region.

With the above-described configuration, for example, when a subject is monitored using a monitoring camera in which a field angle or a zoom position in image capturing can be specified in advance, or the like, because an optimum detection method of a subject can be applied for each region in a screen, it is possible to reduce erroneous detection while accurately detecting a subject. In this manner, by selecting various types of information to be used in performing image capturing of a subject, as camera information to be referred to for setting a detection region for detecting a subject, optimum subject detection suitable for a main imaging target subject intended by the user is enabled.

In this modified example, because a detection method (region) of a subject is set in accordance with a subject distance, for example, this modified example is especially effective in a configuration involving a small change in imaging field angle after the installation, such as a security camera like the monitoring camera 101. For example, when the monitoring camera 101 is installed, by the user selecting a predetermined range in an image displayed on the display device 105, and inputting distance information, acquisition of distance information and resetting of a detection region of a subject become unnecessary after that. If the monitoring camera 101 is configured to perform zooming, panning, and tilt operations, it is only required that acquisition of distance information and setting of a detection region of a subject are performed in accordance with a change in imaging field angle of the monitoring camera 101.

Furthermore, for example, when a detection target subject is a person, unlike regions corresponding to roads, pathways, and the like in an image, the person is less likely to pass through regions corresponding to external portions of buildings, sky, sea, and the like. Thus, when the monitoring camera 101 according to this modified example is installed, a region in which predetermined subject detection is not to be performed may be preset. More specifically, the user may be enabled to designate in advance a region not settable as a detection region of a subject. With this configuration, because a region not used for the detection of a subject is predetermined in an image (or imaging field angle), it is possible to reduce processing load related to detection processing of a subject.

In a second exemplary embodiment, the description will be given of a configuration of setting a detection method (region) to be used in detecting a subject, based on information regarding a region manually selected (set) by the user via the input device 104, and determining exposure based on a detection result of a subject that is obtained using the detection method. Because the configurations of the monitoring camera 101, the network 102, the client device 103, the input device 104, and the display device 105 included in an imaging system according to the present exemplary embodiment are similar to those in the above-described first exemplary embodiment, the description will be omitted.

Figure 9:
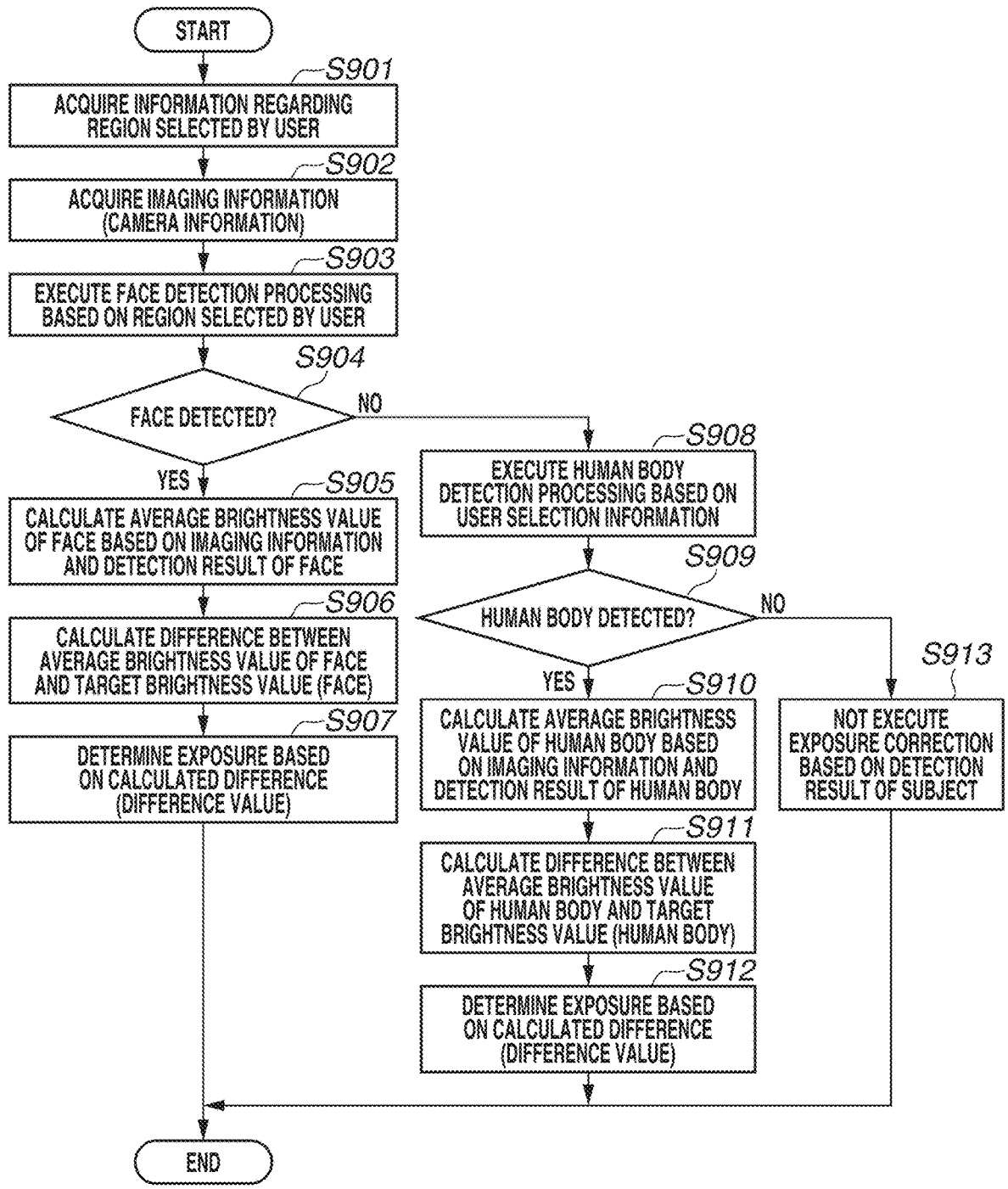
FIG. 9 is a flowchart exemplarily illustrating detection processing and exposure determination processing according to a second exemplary embodiment of the present invention.

Hereinafter, detection processing of subject detection processing and exposure determination processing according to the present exemplary embodiment will be described with reference to a flowchart illustrated in FIG. 9. FIG. 9 is a flowchart exemplarily illustrating detection processing and exposure determination processing according to the second exemplary embodiment of the present invention. Because a start timing of the processing is similar to that in the first exemplary embodiment, the description will be omitted.

Figure 10:
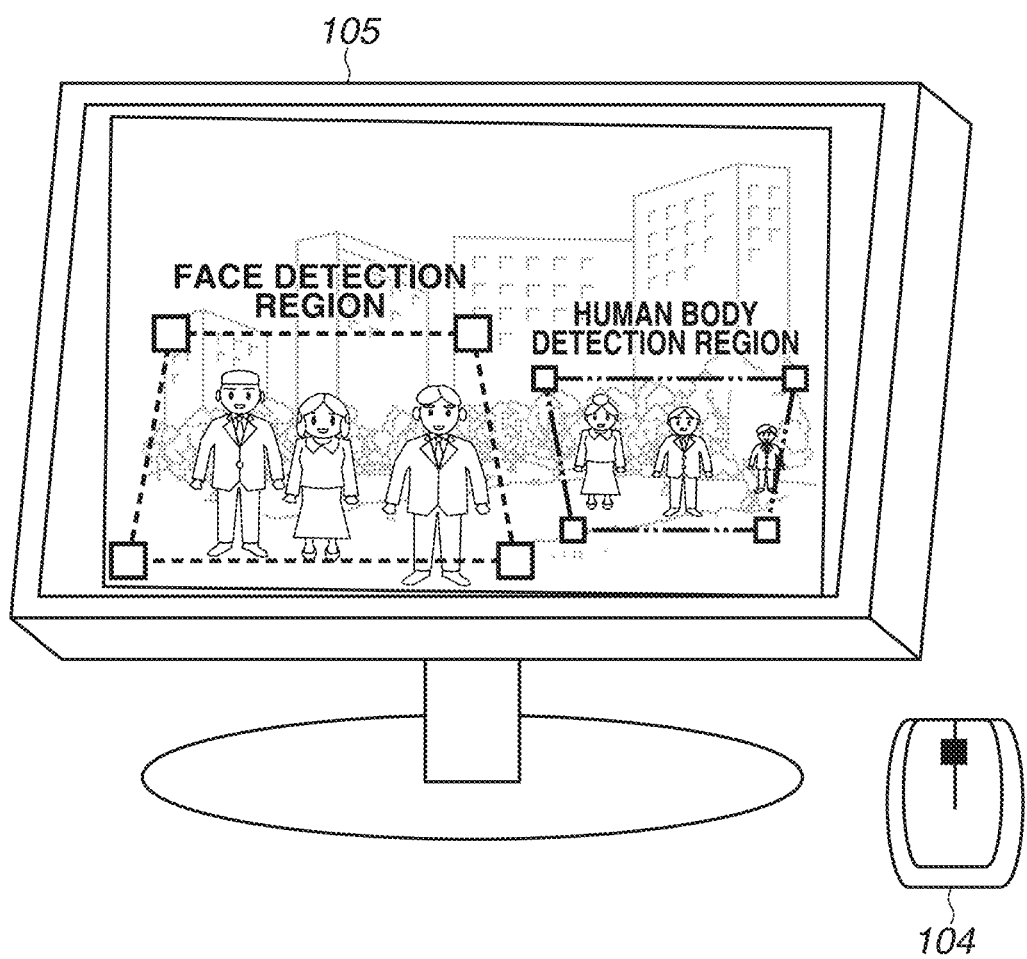
FIG. 10 is a diagram exemplarily illustrating a user interface (UI) manually-operable by a user according to the second exemplary embodiment of the present invention.

First of all, in step S901, information regarding a region manually set (selected) by the user via the input device 104 is acquired. FIG. 10 is a diagram exemplarily illustrating a user interface (UI) manually-operable by the user according to the second exemplary embodiment of the present invention. For example, based on a UI as illustrated in FIG. 10, the user can select (set) a face detection region and a human body detection region in an image using the input device 104 and the display device 105. In this example, rectangular portions superimposed on vertices of each detection region as illustrated in FIG. 10 are manipulators for setting a detection region of a subject. By selecting the rectangular portion and moving the selected rectangular portion within the image (displayed on the display device 105), the user can change the shape of a detection region of a subject to an arbitrary size. Any configuration may be employed as a selection method of a rectangular portion. For example, in the case of using a mouse-type input device 104 as illustrated in FIG. 10, a rectangular portion may be selected by a click operation performed using the input device 104. In the case of a configuration in which the input device 104 and the display device 105 are integrated (e.g., a touch panel type display device 105, etc.), an arbitrary rectangular portion may be selected by the user directly touching an image displayed on the display device 105.

The processing in step S902 is substantially similar to the processing in step S502 in the above-described first exemplary embodiment, the description will be omitted. Next, in step S903, the subject detection unit 406 executes face detection based on the face region selected by the user that has been acquired in step S901. Because the method of face detection is similar to that in the above-described first exemplary embodiment, the description will be omitted.

In step S904, the client CPU 301 determines whether a face region has been detected in the image in the face detection executed in step S903. When a face region is not detected (NO in step S904), the processing proceeds to processing in step S908, and when at least one face region is detected (YES in step S904), the processing proceeds to processing in step S905.

In step S905, the exposure determination unit 407 calculates an average brightness value of the face region in the image based on a photometry mode set in the monitoring camera 101, and the result of face detection that is acquired in the processing in step S903. Hereinafter, the detailed calculation method will be described using the drawings and Expressions.

Figure 11:
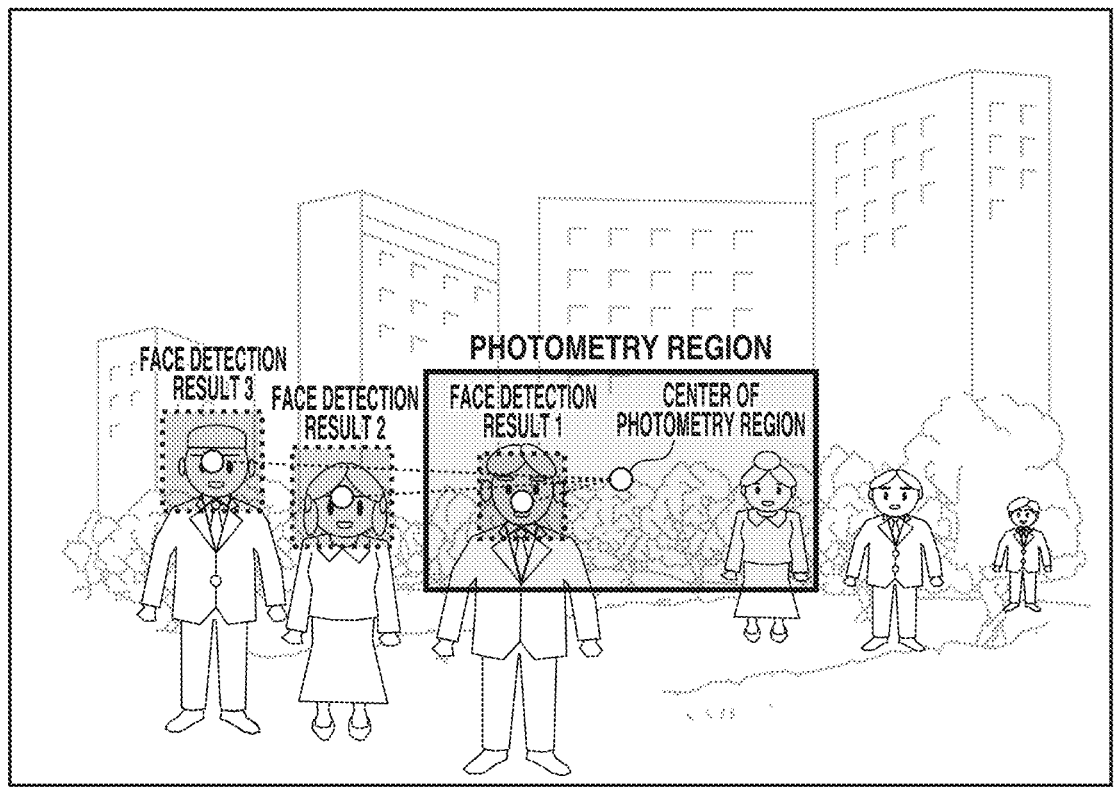
FIG. 11 is a diagram exemplarily illustrating a relationship between a photometry region and a face detection result according to an exemplary embodiment of the present invention.

FIG. 11 is a diagram exemplarily illustrating a relationship between a photometry region and a face detection result according to an exemplary embodiment of the present invention. As described above also in the first exemplary embodiment, a photometry mode and a photometry region that are set in performing image capturing of a subject are intended as a region to which the user pays attention in image capturing (interest region), and it can be estimated that a main subject is highly likely to exist in the region. Furthermore, in the present exemplary embodiment, because a detection region of a subject (face detection region, etc.) is set to an arbitrary region in an image by a manual operation of the user, a main imaging target subject intended by the user is highly likely to exist in the region in the image that has been set by the user by the manual operation.

Thus, in the present exemplary embodiment, as illustrated in FIG. 11, exposure is determined based on a photometry region set in image capturing, and a detection result of a subject detected based on a detection region of a subject that has been manually set by the user. More specifically, as illustrated in FIG. 11, an importance degree of a detection result of a subject with a distance closer to the center position of the photometry region (the custom photometry mode is assumed to be set in the example illustrated in FIG. 11) is estimated to be higher as an imaging (monitoring) target. For example, in the example illustrated in FIG. 11, a subject corresponding to a face detection result 1 is estimated to have a high importance degree as an imaging target, and after that, subjects corresponding to a face detection result 2 and a face detection result 3 are estimated to have high importance degrees in this order. Then, considering a relative positional relationship between a position of a photometry region and a detection result of a subject, an average brightness value related to a detection region of a subject is calculated. For example, the average brightness value is calculated as in the following Expressions (7) to (9).

$$\bar{I}_{face} = \frac{\sum_{s=1}^{f} w_s \cdot z_s}{\sum_{s=1}^{f} w_s} \quad (7)$$

$$z_s = \frac{\sum_{i=-k_s/2}^{k_s/2} \sum_{j=-l_s/2}^{l_s/2} I(v_s + i, h_s + j)}{k_s \times l_s} \quad (8)$$

$$w_s = \frac{1}{\sqrt{(x_s - x_p)^2 + (y_s - y_p)^2}} \quad (9)$$

Expression (7) is an expression for calculating a face average brightness value considering a distance from the center of the photometry region to the detected subject, Expression (8) is an expression for calculating an average brightness value of a detected subject (face region), and Expression (9) is an expression for calculating an inverse of a distance from the center of the photometry region to the detected subject. (Xp, Yp) denotes a center position (two-dimensional coordinates) of the photometry region in the image, (Xs, Ys) denotes a position (two-dimensional coordinates) in the image of each of the detected subjects, and furthermore, Zs denotes an average brightness value of the detected subjects. In addition, s in Expressions (7) to (9) denotes a number for identifying a detected subject (s is an integer of 1 or more), and in the present exemplary embodiment, numbers are sequentially allocated to subjects with closer distances from the center of the photometry region. For example, in the example illustrated in FIG. 11, the position of the face detection result 1 is denoted by (X1, Y1), and a face average brightness value of the face detection result 1 is denoted by Z1. The other codes have meanings that are the same as those used in Expression (1).

In Expression (1) in the above-described first exemplary embodiment, when a plurality of face regions is detected, a face average brightness value is calculated using equal weighting for average values of all the face regions. In contrast to this, in the present exemplary embodiment, as indicated in Expression (7), a weighting degree corresponding to the distance ws from the photometry region is set. With this configuration, a subject positioned closer to the photometry region exerts larger influence on exposure determined in steps S906 to S907, which will be described below.

In step S906, similarly to the above-described Expression (5), a difference (difference value) between a target brightness value of a predefined face region and the face average brightness value calculated in step S905 is calculated. Then, in step S907, similarly to the above-described Expression (6), a correction amount of exposure is determined based on the difference calculated in step S906, a predefined threshold value, and the current exposure. Because the processing in steps S906-S907 is executed based on operational expressions substantially the same as those in the processing in steps S506-S507 in the above-described first exemplary embodiment except that an average brightness value becomes a face average brightness value, the detailed description will be omitted. The above-described processing is processing performed when at least one face region is detected in the present exemplary embodiment.

Next, processing performed when a face region is not detected according to the present exemplary embodiment will be described. When a face region is not detected in the processing in step 904 (No in step 904), in step S908, the subject detection unit 406 executes human body detection in a human body detection region set by the user, based on the information acquired in step S901.

Next, in step S909, based on a result of the human body detection executed in step S908, it is determined whether a human body region has been detected in the image. When at least one human body region is detected (YES in step S909), the processing proceeds to step S910, and when a human body region is not detected (NO in step S909), the processing proceeds to step S913. When the processing proceeds to processing in step S913 (i.e., a face region and a human body region are not detected) (NO in step S909), exposure correction that is based on a detection result of a subject is not performed. Because the processing in steps S910-S912 is executed based on operational expressions substantially the same as those in the above-described processing in steps S905 to S907 except that an average brightness value of a human body region is calculated and exposure is determined, the detailed description will be omitted.

As described above, in the imaging system according to the present exemplary embodiment, it is possible to determine exposure based on information regarding a detection region of a subject manually set by the user that is obtained via the input device 104, in addition to information obtained from the camera information acquisition unit 404. With this configuration, it is possible to more efficiently set appropriate exposure for a main imaging target subject intended by the user.

In the present exemplary embodiment, the description has been given of a configuration of performing weighting in the calculation of a brightness value of a detected subject and determining exposure, based on a position of a photometry region in an image in addition to information regarding a detection region of a subject set by the user, but the configuration is not limited to this. For example, weighting for a subject needs not be performed taking a photometry region into consideration. In this case, it is possible to calculate a brightness value of a subject detected based on a detection region of a subject that is arbitrarily set by the user, without estimating the intention of the user.

In a third exemplary embodiment, the description will be given of a configuration of setting a detection method (region) to be used in detecting a subject, based on a detection score calculated from a detection unit, and determining exposure based on a detection result of a subject that is obtained using the detection method. The detection score is an evaluation value indicating a reliability degree of the detection result obtained by the detection unit. As a value of the detection score gets larger, a probability at which a detection target exists in the set detection method (region)

gets higher, and as a value of the detection score gets smaller, a possibility at which a detection target does not exist (i.e., erroneous detection) gets higher. The detection score to be described in the present exemplary embodiment will be described using a value normalized within a value range in which the smallest value is 0 and the largest value is 100, for the sake of convenience, but the detection score is not limited to this.

Figure 12:
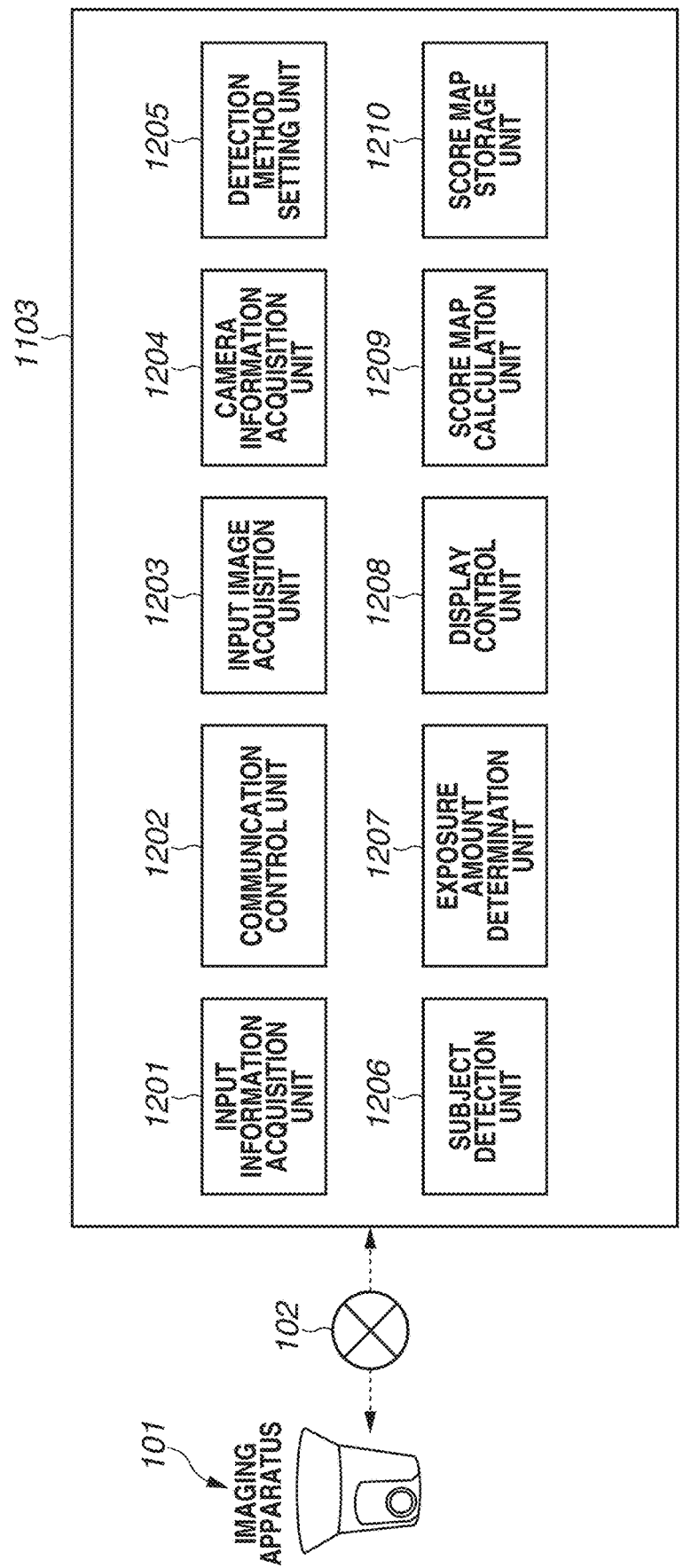
FIG. 12 is a diagram exemplarily illustrating a function and a configuration executed by a client device according to a third exemplary embodiment of the present invention.

FIG. 12 is a diagram exemplarily illustrating a function and a configuration executed by a client device 1103 according to the third exemplary embodiment of the present invention. Because the configurations of the monitoring camera 101, the network 102, the input device 104, and the display device 105 included in an imaging system according to the present exemplary embodiment are similar to those in the above-described exemplary embodiments, the description will be omitted. In addition, the client device 1103 according to the present exemplary embodiment partially includes the same components as the above-described client device (illustrated in FIG. 4) according to the first exemplary embodiment. For example, because an input information acquisition unit 1201, a communication control unit 1202, an input image acquisition unit 1203, a camera information acquisition unit 1204, a detection method setting unit 1205, a subject detection unit 1206, an exposure determination unit 1207, and a display control unit 1208 of the client device 1103 are similar to the components included in the client device 103 (illustrated in FIG. 4) in the above-described first exemplary embodiment, the description will be omitted. Thus, the client device 1103 according to the present exemplary embodiment will be hereinafter described only regarding a configuration different from the client device 103 in the first exemplary embodiment.

A score map calculation unit 1209 is a calculation unit that calculates a score map based on a subject detection position and a detection score calculated by the subject detection unit 1206. The details of the calculation method of a score map will be described below. A score map storage unit 1210 is a recording unit that stores the score map calculated by the score map calculation unit 1209.

Figure 13A:
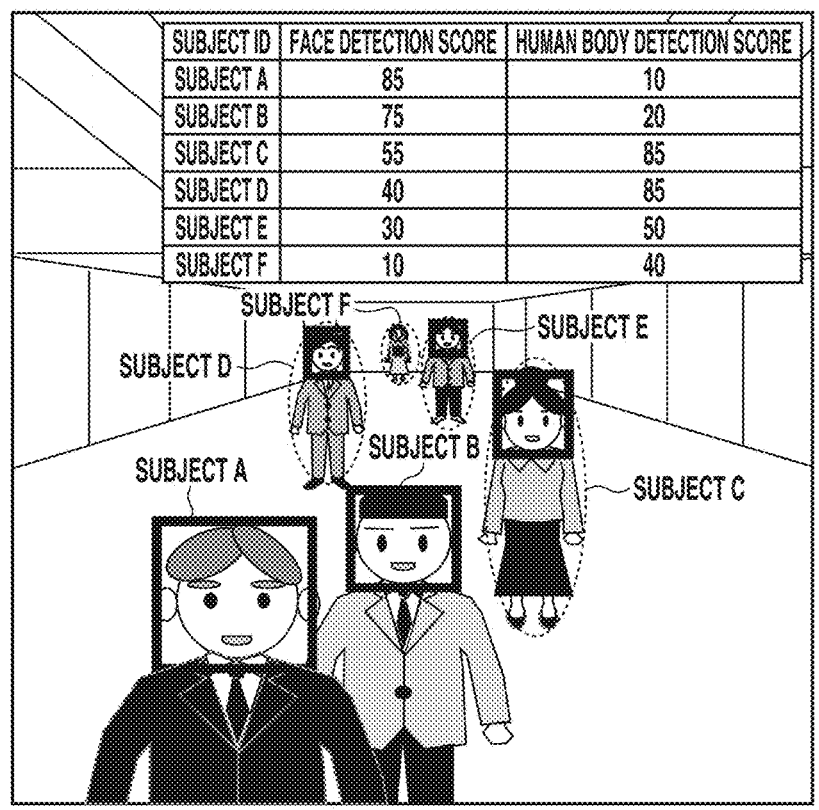
Figure 13B:
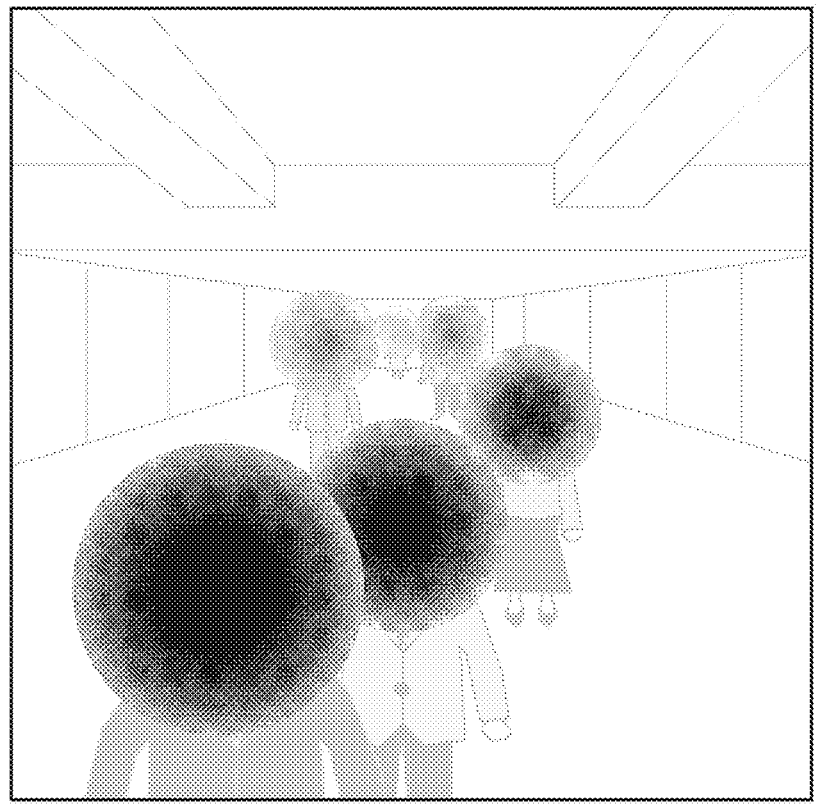

FIGS. 13A-13C are diagrams exemplarily illustrating a calculation method of a score map according to the third exemplary embodiment of the present invention. FIG. 13A is a diagram exemplarily illustrating a subject detection result in the entire field angle (image), FIG. 13B exemplifies a single score map, and FIG. 13C exemplifies an accumulated score map obtained by accumulating score maps each obtained by the single score map, over a plurality of frames. In the following description, a score obtained from a result of face detection will be referred to as a face detection score, a score obtained from a result of human body detection will be referred to as a human body detection score, a score map obtained in a single frame will be referred to as a single score map, and a score map obtained by accumulating score maps over a plurality of frames will be referred to as an accumulated score map. Because the methods of face detection and human body detection are the same as those in the above-described exemplary embodiments, the description will be omitted in the present exemplary embodiment.

As illustrated in FIG. 13A, for example, a scene in which a plurality of subjects (subjects A to F) exist in a depth direction is assumed. Among the subjects, the subject A is a subject existing at the closest distance in a field angle, and has the largest face region although the total body does not fall within the field angle. On the other hand, the subject F is a subject existing at the farthest distance in the field angle, and the total body falls within the field angle although the face region is the smallest. In this example, subject distances of the subjects A to F get farther in the alphabetical descending order. A solid-line rectangle illustrated in FIG. 13A indicates a face detection region that is based on a face detection result, and a broken-line ellipse indicates a human body detection region that is based on a human body detection result.

In addition, a table illustrated in FIG. 13A (in the upper right in FIG. 13A) lists results of a face detection score and a human body detection score of each subject. For example, because images of the subjects A and B are captured with large face regions, values of face detection scores become large, but because their total bodies do not fall within the field angle, human body detection scores become small. On the other hand, because the subjects C and D have face regions with small sizes, face detection scores become small, but because their total bodies fall within the field angle, values of human body detection scores become large. In addition, because the subjects E and F have far subject distances, and not only faces but also total body shapes are difficult to be detected, face regions and human body regions are both small and face detection scores and human body detection scores both become small.

FIG. 13B illustrates a single score map generated based on detection results of face regions among the aforementioned subject detection results and detection scores. In the present exemplary embodiment, as illustrated in FIG. 13B, for example, the single score map is calculated by applying a Gaussian filter corresponding to a score that is centered on a detection target subject region (face region in FIG. 13B). The color of the shading added to the single score map illustrated in FIG. 13B gets darker (pixel value gets smaller) as a face detection score of a region gets larger, and gets paler (pixel value gets larger) as a face detection score of a region gets smaller. In the field angle, the shading corresponding to each subject is displayed over a subject region, and FIG. 13C illustrates an accumulated score map obtained by accumulating the above-described single score maps corresponding to a plurality of frames. For example, a single score map and an accumulated score map at a time t>2 are denoted by M(v, h, t) and N(v, h, t), and an accumulated score map at a time t−1 is denoted by N'(v, h, t−1). In this case, an accumulation score map at a time t is calculated by the weighted addition represented by Expressions (10) and (11). (v, h, t) denotes central coordinates and a time at which a face or a human body is detected.

$$N(v,h,t)=(1.0-\gamma)\times N(v,h,t-1)+\gamma\times M(v,h,t) \tag{10}$$

$$0.0 \leq \gamma \leq 1.0 \tag{11}$$

At this time, an accumulated score map at a time t=1 that cannot be defined by Expressions (10) and (11) is calculated based on camera information, distance information, and a manual operation of the user that have been described in the above-described first and second exemplary embodiments. For example, in the case of calculating an accumulated score map at a time t=1 based on distance information, in a close distance region in which a face detection score is estimated to be large, the shading color of a grayscale map is set to be dark, and in a far distance region, the shading color is set to be pale.

In addition, a parameter γ in Expressions (10) and (11) is a coefficient for controlling influence to be exerted on the accumulated score map of the current frame by an accumulated score map of past frames and a single score map of the current frame, and can be arbitrarily changed. For example, in an environment in which a change in illumination intensity is small and the incoming/outgoing of people continuously occurs irrespective of the lapse of time, as in indoor commerce facilities, γ=0.5 is set. In this case, in the transition of the single score map over the lapse of time, because equal weighting is added to both of past results and the current result, a stable accumulated score map can be calculated in an environment with a small time variation. On the other hand, in an environment in which illumination intensity and the incoming/outgoing of people drastically change in accordance with the lapse of time, like a gateway of an outdoor stadium, γ=0.8 is set. In this case, in the transition of the single score map over the lapse of time, a score map having high adaptability to the current imaging environment can be calculated.

In addition, in Expressions (10) and (11), an accumulated score map is calculated using a function having a filter property of an infinite impulse response (IIR) filter, but the calculation is not limited to this. For example, an accumulated score map may be derived using a function having a filter property of a finite impulse response (FIR) filer or a nonlinear function, and frames to be referred to are not limited to past frames. Because an accumulated score map that is based on human body detection is also calculated similarly to an accumulated score map that is based on face detection, the detailed description will be omitted. The detection score maps have been described above.

(Detection Processing of Subject and Exposure Determination Processing)

Figure 14:
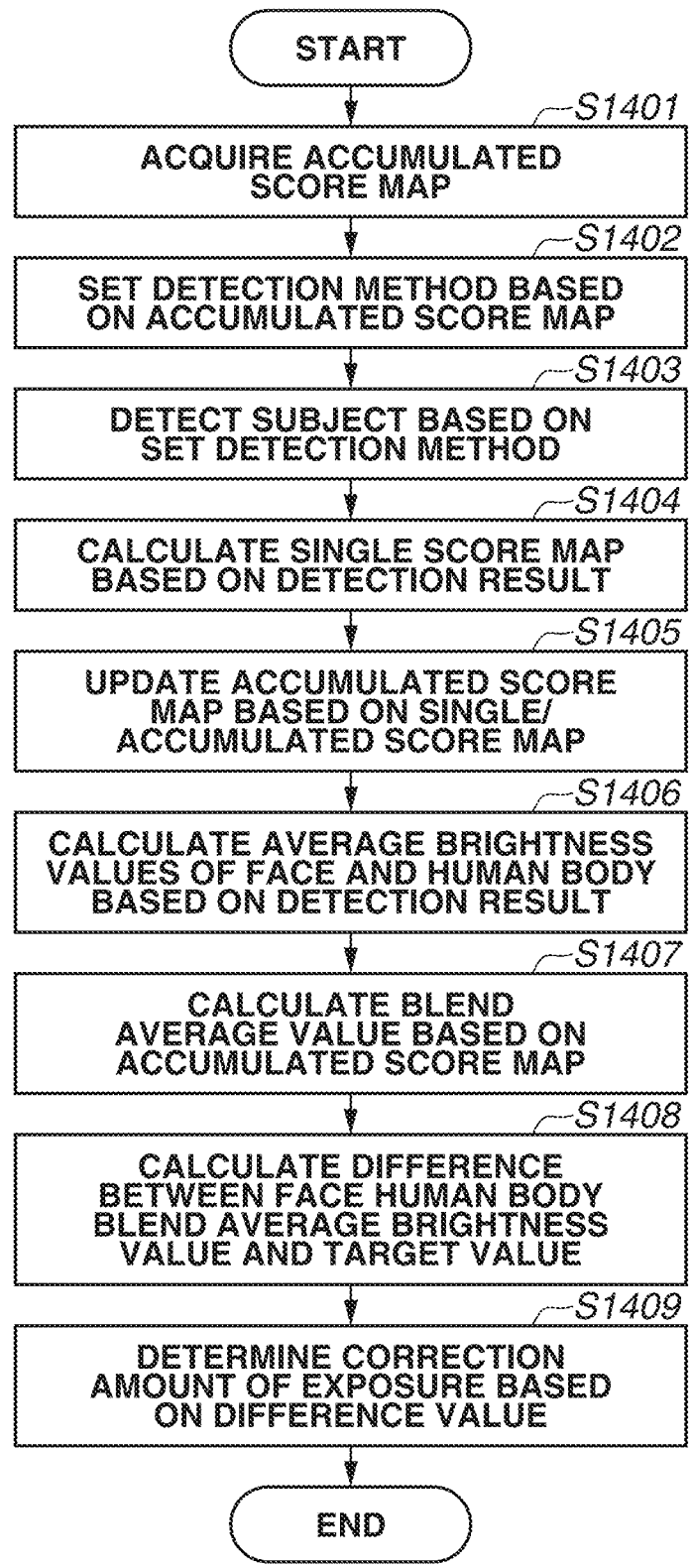
FIG. 14 is a flowchart exemplarily illustrating detection processing and exposure determination processing according to the third exemplary embodiment of the present invention.

Subsequently, detection processing of a subject and exposure determination processing according to the present exemplary embodiment will be described with reference to FIG. 14. FIG. 14 is a flowchart exemplarily illustrating detection processing and exposure determination processing according to the third exemplary embodiment of the present invention.

First of all, in step S1401, the score map calculation unit 1209 acquires an accumulated score map corresponding to each detected subject, based on the above-described method, and stores the accumulated score map in the score map storage unit 1210. The accumulated score map is a map in which the transition in detection score over the lapse of time is reflected as illustrated in FIG. 13C.

Next, in step S1402, the detection method setting unit 1205 sets a detection method (detection target) of a subject based on the accumulated score map acquired in step 1401. In the accumulated score map according to the present exemplary embodiment, detection reliability is based on the shading color of the map, and as the shading color gets darker (pixel value gets smaller), detection reliability gets higher, and a subject becomes more likely to have existed in the recent frames. Thus, by comparing the shading color (pixel value) of the accumulated score map and an arbitrarily set threshold value TH for each pixel, a detection method of a subject is set for a region with a dark shading color (small pixel value).

The aforementioned threshold value TH may be dynamically set in accordance with detection frequency of a subject that varies in accordance with the lapse of time. For example, when the number of detected face regions or the number of detected human body regions decreases in accordance with the lapse of time, a large threshold value TH is set. More specifically, a low-density region on the score map is set as a detection target of a subject, and the entire detection region is extended. With this configuration, because a wider range can be set as a detection target, a detection region less susceptible to a variation in detection frequency of a subject that varies in accordance with the lapse of time can be set.

On the other hand, when the incoming/outgoing of subjects drastically changes in accordance with the lapse of time, and processing load of the entire system increases, a small threshold value TH is set. More specifically, a low-density region on the score map is set to be excluded from a detection target of a subject, and a detection target region is restricted. With this configuration, it is possible to perform subject detection only in a region with the highest detection frequency of a subject (highest probability of existence of a subject).

Next, in step S1403, the subject detection unit 1206 detects an arbitrary subject based on the detection method set in step S1402. For example, the detection of a face region is executed in a region in which a face region is set as a detection target of the detection method. Because the method of detection is similar to that in the above-described exemplary embodiments, the description will be omitted. Information regarding a subject detection position and a detection score that are calculated after the subject detection is transmitted to the score map calculation unit 1209.

Next, in step S1404, the score map calculation unit 1209 calculates a single score map based on the subject detection position and the detection score. The calculation method of the single score map has been described with reference to FIG. 13B.

Next, in step S1405, the score map calculation unit 1209 updates the accumulated score map based on the single score map of the current frame that is calculated in step S1404, and the accumulated score map of the past frames that is acquired from the score map storage unit 1210. The update method of the accumulated score map has been described with reference to FIG. 13C.

The description has been given of an example in which the above-described parameter γ is changed in accordance with an imaging environment, but the configuration is not limited to this. For example, in the case of executing face recognition, a face recognition score may be obtained in addition to a face detection score, and the parameter γ may be changed in accordance with these scores. The recognition score is an evaluation value that is based on a degree of coincidence obtained by checking face data detected by the subject detection unit 1206, against face data pre-registered by the user. With this configuration, it is possible to calculate an accumulated score map in which weighting is added to subject information to which the user pays attention, in addition to various types of face detection information varying in accordance with the lapse of time.

Next, in step S1406, the exposure determination unit 1207 calculates average brightness values of a face and a human body based on the detection result calculated in step S1403. In the present exemplary embodiment, a face region and a human body region are assumed to be set as detection targets based on the accumulated score map. Because the calculation method is a method that is substantially the same as that used in step S505 in the above-described exemplary embodiments, the detailed description will be omitted.

Next, in step S1407, based on the average brightness value of the face region and the average brightness value of the human body region that are calculated in step S1406, and the accumulated score map updated in step S1405, an average brightness value obtained by blending the face region and the human body region is calculated. The calculation method is a method that is substantially the same as that used in step S506 in the above-described exemplary embodiments, and the parameter α in Expression (4) is controlled based on the accumulated score map. For example, comparison is made with the accumulated score map of human body detection, and if the accuracy of the accumulated score map of face detection is higher, the parameter α is set to a large value. In this manner, by controlling the parameter α, it becomes possible to perform exposure control by increasing weighting for a detection region with high accuracy of a detection score. Because the subsequent processing in steps S1408 to S1409 is substantially the same as the processing in steps S506 to S507 in the above-described exemplary embodiments, the detailed description will be omitted.

As described above, in the imaging system according to the present exemplary embodiment, it is possible to determine exposure based on a score map of each subject that is obtained from the score map calculation unit 1209, in addition to information obtained from the camera information acquisition unit 404. With this configuration, an optimum detection method (detection target subject) is set in accordance with a change in imaging environment or subject emergence frequency, and more accurate exposure setting is enabled.

The exemplary embodiments of the present invention have been described above, but the present invention is not limited to these, and various modifications and changes can be made without departing from the scope of the invention. For example, as changeable exposure parameters, an aperture value (AV) related to an aperture diameter of the above-described diaphragm, a value (TV) related to an accumulation time of the image sensor 202, and a value (SV) related to sensitivity (ISO sensitivity) in image capturing are settable, but the exposure parameters are not limited to these. For example, if a darkening unit such as a neutral density (ND) filter that reduces an amount of light entering the image sensor 202 is provided, exposure control may be performed considering an exposure control value related to the density of the ND filter.

In addition, in the above-described exemplary embodiments, the description has been given of a configuration of calculating a corrected exposure EVcorrection considering an exposure correction amount for EVcurrent calculated based on a preset photometry mode, but the configuration is not limited to this. For example, exposure control may be simply performed based on a brightness value (BV) obtained as the face human body blend average brightness value $I_{blend}$, and exposure may be determined. Specifically, based on program lines related to exposure control that are preset in either the monitoring camera 101 or the client device 103, and the face human body blend average brightness value $I_{blend}$, each parameter of exposure may be determined.

In addition, in the above-described exemplary embodiments, the description has been given of a configuration in which the above-described detection processing of a subject and exposure determination processing are automatically started upon the client device 103 acquiring an image input from the monitoring camera 101, but the configuration is not limited to this. For example, detection processing of a subject and exposure determination processing may be executed in accordance with a manual operation input performed by the user. Further, the detection processing of a subject may be executed at a cycle longer than the update cycle of exposure in exposure control, or may be executed in accordance with a manual operation performed by the user, an image capturing (recording) start, or a change in field angle that is caused by a zoom operation, panning, tilt, or the like. Furthermore, in the case of setting a face detection region or a human body detection region in accordance with a photometry region or a peripheral region of the photometry region as in the above-described first exemplary embodiment, detection processing of a subject may be executed in accordance with the switching of a photometry mode or a change in photometry region.

In the above-described exemplary embodiments, the client device 103 is assumed to be an information processing apparatus such as a personal computer (PC), and the monitoring camera 101 and the client device 103 in the imaging system are assumed to be connected in a wired or wireless manner, but the configuration is not limited to this. For example, an imaging apparatus such as the monitoring camera 101 may function as an information processing apparatus equivalent to the client device 103, and the imaging apparatus may include the input device 104 and the display device 105. A part of the above-described operations executed by the client device 103 may be executed by an imaging apparatus such as the monitoring camera 101.

In the above-described exemplary embodiments, the description has been given of a so-called lens-integrated imaging apparatus in which the imaging optical system 201 is formed integrally with the monitoring camera 101, as an example of an imaging apparatus that implements an exemplary embodiment of the present invention, but the imaging apparatus is not limited to this. For example, a so-called interchangeable-lens imaging apparatus in which the monitoring camera 101 and a lens unit including the imaging optical system 201 are separately provided may be used as an imaging apparatus that implements an exemplary embodiment of the present invention.

In the above-described exemplary embodiments, the description has been given assuming a monitoring camera as an example of an imaging apparatus that implements an exemplary embodiment of the present invention, but the imaging apparatus is not limited to this. For example, an imaging apparatus other than a monitoring camera such as a digital camera, a digital video camera, a portable device such as a smartphone, or a wearable device may be employed. In the above-described exemplary embodiments, an electronic device such as a PC is assumed as an example of the client device 103 serving as an information processing apparatus that implements an exemplary embodiment of the present invention, but the client device 103 is not limited to this. For example, as the client device 103, another electronic device such as a smartphone or a tablet terminal may be employed.

In the above-described exemplary embodiments, the client CPU 301 of the client device 103 is configured to execute each function as illustrated in FIG. 4, but each of the functions may be included as another unit different from the client CPU 301.

(Other Exemplary Embodiments)

An exemplary embodiment of the present invention can also be implemented by processing of supplying a program for implementing one or more functions of the aforementioned exemplary embodiments, to a system or an apparatus via a network or a storage medium, and one or more processors in a computer of the system or the apparatus reading the program and executing the program. The exemplary embodiment can also be implemented by a circuit that implements one or more functions (e.g., ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-201267, filed Oct. 25, 2018, and No. 2019-151406, filed Aug. 21, 2019, which are hereby incorporated by reference herein in their entirety.

What is claimed is:

1. An information processing apparatus comprising:
at least one processor or circuit configured to perform operations of the following units;
an image acquisition unit configured to acquire an image obtained by performing image capturing of a subject using an imaging unit;
a detection method setting unit configured to set a detection method of a subject for the image;
a subject detection unit configured to detect a subject based on the detection method determined by the detection method setting unit; and
an exposure determination unit configured to determine exposure based on a detection result obtained from the subject detection unit,
wherein the detection method setting unit can set the detection method different for each of different regions in the image, based on information regarding a distance to a subject used in performing image capturing for obtaining the image.

2. The information processing apparatus according to claim 1,
wherein at least face detection detecting a face region in the image, and human body detection detecting a human body region in the image are settable as the detection method of the subject.

3. The information processing apparatus according to claim 2,
wherein at least face detection of preferentially detecting a face region in the image, and human body detection of preferentially detecting a human body region in the image are settable as the detection method of the subject, and
wherein the detection method setting unit sets a region in which the face detection is to be performed, in accordance with a photometry region to be used in performing image capturing of a subject, and determines a region in which the human body detection is to be performed, in accordance with a peripheral region of the photometry region.

4. The information processing apparatus according to claim 2, wherein the detection method setting unit sets a region in the image in which face detection detecting a face region is to be performed, in accordance with a region in the image in which a reliability degree related to face detection calculated by the subject detection unit falls within a predetermined range, and sets a region in the image in which human body detection detecting a human body region is to be performed, in accordance with a region in the image in which a reliability degree related to human body detection calculated by the subject detection unit falls within a predetermined range.

5. The information processing apparatus according to claim 2, wherein the exposure determination unit determines exposure such that weighting for a region in which the face detection is to be performed and a region in which the human body detection is to be performed that have been set by the detection method setting unit, becomes larger than that for another region in the image.

6. The information processing apparatus according to claim 5, wherein the exposure determination unit determines exposure based on at least one piece of information about a size, a number, and a position in the image, as information regarding a face and a human body detected by the face detection and the human body detection.

7. The information processing apparatus according to claim 1, wherein the detection method setting unit sets a region in the image in which face detection of preferentially detecting a face region is to be performed, in accordance with a region in the image having a distance to a subject that falls within a first range, and sets a region in the image in which human body detection of preferentially detecting a human body region is to be performed, in accordance with a region in the image having a distance to a subject that falls within a second range farther than the first range.

8. A control method of an information processing apparatus, the control method comprising:
acquiring an image obtained by performing image capturing of a subject using an imaging unit;
setting a detection method of a subject for the image and detecting a subject; and
determining exposure based on a detection result obtained in the detecting,
wherein, in the detecting, the detection method different for each of different regions in the image is set based on information regarding a distance to a subject used in performing image capturing for obtaining the image.

9. A non-transitory computer-readable storage medium storing a program for causing a processor to execute a method of controlling an information processing apparatus, the control method comprising:
acquiring an image obtained by performing image capturing of a subject using an imaging unit;
setting a detection method of a subject for the image and detecting a subject; and
determining exposure based on a detection result obtained in the detecting, wherein, in the detecting, the detection method different for each of different regions in the image is set based on information regarding a distance to a subject used in performing image capturing for obtaining the image.

10. An imaging system including an imaging apparatus including an imaging unit, and an information processing apparatus connectable with the imaging apparatus, wherein the information processing apparatus includes:

at least one processor or circuit configured to perform operations of the following units;

an image acquisition unit configured to acquire an image obtained by performing image capturing of a subject using the imaging unit;

a detection method setting unit configured to set a detection method of a subject for the image;

a subject detection unit configured to detect a subject based on the detection method determined by the detection method setting unit; and an exposure determination unit configured to determine exposure based on a detection result obtained from the subject detection unit, and wherein the detection method setting unit can set the detection method different for each of different regions in the image, based on information regarding a distance to a subject used in performing image capturing for obtaining the image.

\* \* \* \* \*